United States Patent
Lucas et al.

(10) Patent No.: US 10,923,874 B2
(45) Date of Patent: Feb. 16, 2021

(54) MULTIPLE SOLITON COMB GENERATION METHOD AND DEVICE

(71) Applicant: ECOLE POLYTECHNIQUE FEDERALE DE LAUSANNE (EPFL), Lausanne (CH)

(72) Inventors: Erwan Guillaume Albert Lucas, Lausanne (CH); Grigory Lihachev, Moscow (RU); Nikolay Pavlov, Moscow (RU); Michael Gorodetsky, Moscow (RU); Tobias Kippenberg, Aran (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 0 days.

(21) Appl. No.: 16/379,135

(22) Filed: Apr. 9, 2019

(65) Prior Publication Data

US 2019/0312402 A1 Oct. 10, 2019

Related U.S. Application Data

(60) Provisional application No. 62/655,248, filed on Apr. 10, 2018.

(51) Int. Cl.
| | |
|---|---|
| *H01S 3/08* | (2006.01) |
| *H01S 3/094* | (2006.01) |
| *H01S 3/105* | (2006.01) |
| *H01S 3/0941* | (2006.01) |
| *H01S 3/107* | (2006.01) |
| *H01S 3/067* | (2006.01) |
| *H01S 3/16* | (2006.01) |

(52) U.S. Cl.
CPC ...... *H01S 3/06725* (2013.01); *H01S 3/08013* (2013.01); *H01S 3/0941* (2013.01); *H01S 3/094003* (2013.01); *H01S 3/107* (2013.01); *H01S 3/1053* (2013.01); *H01S 3/06745* (2013.01); *H01S 3/06754* (2013.01); *H01S 3/1608* (2013.01); *H01S 2301/085* (2013.01)

(58) Field of Classification Search
CPC .......... H01S 3/08013; H01S 3/094003; H01S 3/0941; H01S 3/06725
USPC ......................................... 372/20
See application file for complete search history.

(56) References Cited

U.S. PATENT DOCUMENTS

| | | | |
|---|---|---|---|
| 8,208,196 B2* | 6/2012 | Fermann | H01S 3/0057 359/328 |
| 10,224,688 B2* | 3/2019 | Koptyaev | G01J 3/453 |
| 10,270,529 B2* | 4/2019 | Karpov | G02F 1/065 |
| 2017/0187161 A1* | 6/2017 | Fermann | H01S 3/1608 |
| 2018/0351319 A1* | 12/2018 | Koptyaev | G01J 4/04 |

* cited by examiner

*Primary Examiner* — Tuan N Nguyen
(74) *Attorney, Agent, or Firm* — Nixon & Vanderhye P.C.

(57) ABSTRACT

The present invention concerns a multiple soliton comb generation method comprising the steps of:
providing a single optical resonator configured to support a plurality of distinct spatial modes in which light can propagate;
providing an optical pump laser source;
simultaneously optically pumping a plurality of distinct spatial modes of the single optical resonator to simultaneously generate independent soliton states in the distinct spatial modes and generate a plurality of frequency combs.

19 Claims, 16 Drawing Sheets

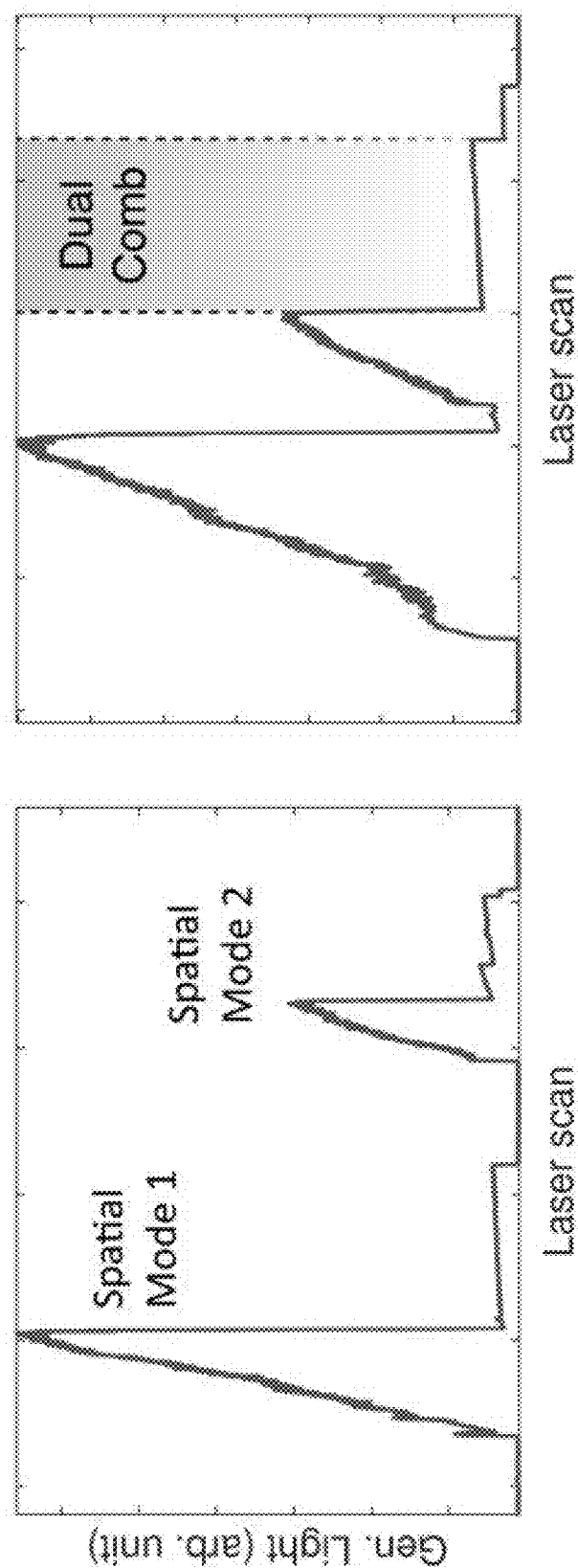

MULTIPLE SOLITON COMB GENERATION METHOD AND DEVICE

CROSS-REFERENCE TO RELATED APPLICATIONS

The present application claims priority to U.S. provisional patent application No. 62/655,248 filed on Apr. 10, 2018, the entire contents thereof being herewith incorporated by reference.

FIELD OF THE INVENTION

The present invention relates to the field of soliton comb generation devices and methods, and more particularly to spatial multiplexing of soliton microcombs.

DISCUSSION OF THE BACKGROUND ART

Optical frequency combs have revolutionized timekeeping and spectroscopy. Combining two or more frequency combs enables advanced sensing schemes with improved speed, accuracy, or spectroscopic dimensionality, without scanning parts. Examples of dual comb applications include real-time and mid-infrared spectroscopy, distance measurements, or coherent anti-Stokes Raman spectral imaging. Yet, these schemes are compounded by the complexity associated with using multiple, conventional laser frequency combs, and the demanding stability requirements. Fourier-transform frequency comb spectroscopy utilizes two optical frequency combs to map the optical field's spectrum to a radiofrequency signal, allowing improved speed, accuracy, or spectroscopic dimensionality, without scanning parts. Such dual-comb techniques have been demonstrated in both real-time and mid-infrared spectroscopy, distance measurements, two-way time transfer, coherent anti-Stokes Raman spectro-imaging, as well as photonic analogue to digital conversion. Despite their promise, these schemes are compounded by the associated cost, complexity, and stability requirements of multiple laser frequency combs.

SUMMARY

It is therefore one aspect of the present disclosure to provide a multiple soliton comb generation apparatus and method that overcomes the above challenges. The multiple soliton comb generation method preferably includes the steps of:

providing a single optical resonator configured to support a plurality of distinct spatial modes in which light can propagate;

providing an optical pump source;

simultaneously optically pumping a plurality of distinct spatial modes of the single optical resonator to simultaneously generate independent soliton states in the distinct spatial modes and generate a plurality of frequency combs.

According to another aspect of the present disclosure, the steps of optically pumping a first distinct spatial mode of the single optical resonator to generate solitons in a first independent soliton state in the first distinct spatial mode and generate a first frequency comb; and optically pumping a second distinct spatial mode of the optical resonator to simultaneously generate solitons in a second independent soliton state in the second distinct spatial mode and generate a second frequency comb.

According to still another aspect of the present disclosure, the optical pumping is carried out using light from a continuous wave laser emission and at least one optical sideband generated via modulation of the laser light, the laser light and the at least one modulated optical sideband having different optical frequencies.

According to still another aspect of the present disclosure, the optical frequencies match soliton-supporting resonances of the single optical resonator.

According to still another aspect of the present disclosure, scanning of the laser emission wavelength is carried out to trigger soliton formation simultaneously in the first and the second spatial modes.

According to still another aspect of the present disclosure, the laser is tuned across the resonances using current or piezo-actuator tuning, or a modulation frequency that generates the at least one modulated optical sideband is adjusted to trigger simultaneous soliton formation in the first and the second spatial modes.

According to still another aspect of the present disclosure, the laser light and the at least one modulated optical sideband co-propagate in the same direction in the single optical resonator.

According to still another aspect of the present disclosure, the laser light and the at least one modulated optical sideband counter-propagate in opposite directions in the single optical resonator.

According to still another aspect of the present disclosure, the laser light is coupled to the single optical resonator to propagate in a first direction in the single optical resonator, and the at least one modulated optical sideband is coupled to the single optical resonator to propagate in a second direction in the single optical resonator, the first and second directions being opposite directions.

According to still another aspect of the present disclosure, the laser light, the first modulated optical sideband, and a second modulated optical sideband optically pump first, second and third distinct spatial modes of the single optical resonator to simultaneously generate first, second and third independent soliton states and generate first, second and third frequency combs.

According to still another aspect of the present disclosure, the laser light is coupled to the single optical resonator to propagate in a first direction in the single optical resonator, and the first and second modulated optical sidebands are coupled to the single optical resonator to propagate in a second direction in the single optical resonator, the first and second directions being opposite directions.

The multiple soliton comb generation device preferably includes a single optical resonator configured to support a plurality of independent or distinct spatial modes in which light can propagate, and an optical pump source configured to simultaneously optically pump a plurality of distinct spatial modes of the single optical resonator to generate independent soliton states in the plurality of distinct spatial modes of the single optical resonator and to generate a plurality of frequency combs.

According to another aspect of the present disclosure, the optical pump source includes a laser and a modulation sideband generator, the modulation sideband generator being configured to generate at least one modulation optical sideband using the laser light, the laser light and the at least one modulation optical sideband having different optical frequencies.

According to still another aspect of the present disclosure, the different optical frequencies match soliton-supporting resonances of the single optical resonator.

According to still another aspect of the present disclosure, the generator further including a controller configured to scan a laser emission wavelength of the laser to trigger soliton formation simultaneously in the plurality of spatial modes.

According to still another aspect of the present disclosure, the controller is configured to tune the laser across the resonances using laser current tuning or piezo-actuator tuning, or is configured to adjust a modulation frequency of the modulation sideband generator to change the optical frequency of the at least one modulation optical sideband to trigger simultaneous soliton formation in the spatial modes.

According to still another aspect of the present disclosure, the modulation sideband generator includes an electro-optical modulator, or a sideband modulator or an IQ-modulator or a differential quadrature phase shift keying modulator.

According to still another aspect of the present disclosure, the pumped plurality of different spatial modes of the single optical resonator are spatial modes of the same polarization.

According to still another aspect of the present disclosure, the generator includes at least one coupler, and the single optical resonator, the optical pump source and the at least one coupler are arranged so that the laser light and the at least one modulation optical sideband co-propagate in the same direction in the single optical resonator.

According to still another aspect of the present disclosure, the generator includes at least one coupler, and first and second circulators; and the single optical resonator, the optical pump source, the at least one coupler and the first and second circulators are arranged so that the laser light and the at least one modulation optical sideband counter-propagate in opposite directions in the single optical resonator.

According to still another aspect of the present disclosure, the first and second circulators are further configured to collect the generated frequency combs from the single optical resonator.

According to still another aspect of the present disclosure, the modulation sideband generator is configured to generate a first and second modulation optical sideband using the laser light, and the single optical resonator, the optical pump source, the at least one coupler and the first and second circulators are arranged so that the laser light, the first modulation optical sideband, and the second modulation optical sideband optically pump first, second and third discrete spatial modes of the single optical resonator to simultaneously generate first, second and third independent soliton states and generate first, second and third frequency combs.

According to still another aspect of the present disclosure, the single optical resonator, the optical pump source, the at least one coupler and the first and second circulators are arranged so that the laser light is coupled to the single optical resonator to propagate in a first direction in the optical resonator, and the first and second modulation optical sidebands are coupled to the single optical resonator to propagate in a second direction in the optical resonator, the first and second directions being opposite directions.

According to still another aspect of the present disclosure, two frequency combs are generated in the second propagating direction, and one frequency comb is generated in the first propagating direction.

The present disclosure demonstrates the simultaneous generation of multiple laser frequency combs from, for example, a single compact Kerr nonlinear optical microresonator. Similar to space division multiplexing in fiber optical communication, where parallel transmission is achieved through multiple spatial modes, the inventors generate several dissipative Kerr soliton states, i.e. continuously circulating solitonic pulses driven by a continuous wave laser, in different spatial modes of a microresonator. Spatial multiplexing enables the simultaneous generation of up to, for example, three independent soliton states thus allowing both dual and triple laser frequency comb generation from one device. The resulting combs can have substantial repetition rate differences, enabling faster acquisition speeds, while avoiding optical-to-RF mapping ambiguity, and rejecting common noise. Employing two spatial modes, the Inventors realize free-running dual comb spectroscopy with amplitude and phase retrieval. The ability to generate a triple soliton-comb, so far never demonstrated in any frequency comb platform, can extend comb-based spectroscopy to higher dimensionality such as in 2D spectroscopy, or can be employed in advanced comb-based distance measurement schemes that have remained impractical with current technology. This technique can be applied to photonic integrated resonators, enabling a substantial reduction in complexity and compatibility with large volume manufacturing.

The above and other objects, features and advantages of the present invention and the manner of realizing them will become more apparent, and the invention itself will best be understood from a study of the following description with reference to the attached drawings showing some preferred embodiments of the invention.

A BRIEF DESCRIPTION OF THE SEVERAL VIEWS OF THE DRAWINGS

FIG. 1A shows an exemplary resonator that is a crystalline whispering gallery mode (WGM) resonator, for example, a crystalline $MgF_2$ WGM resonator.

FIG. 1B shows simulation results of several optical mode profiles supported by the WGM protrusion.

FIG. 1C is a schematic representation of the three exemplary embodiments of the present disclosure.

Figure 1A:
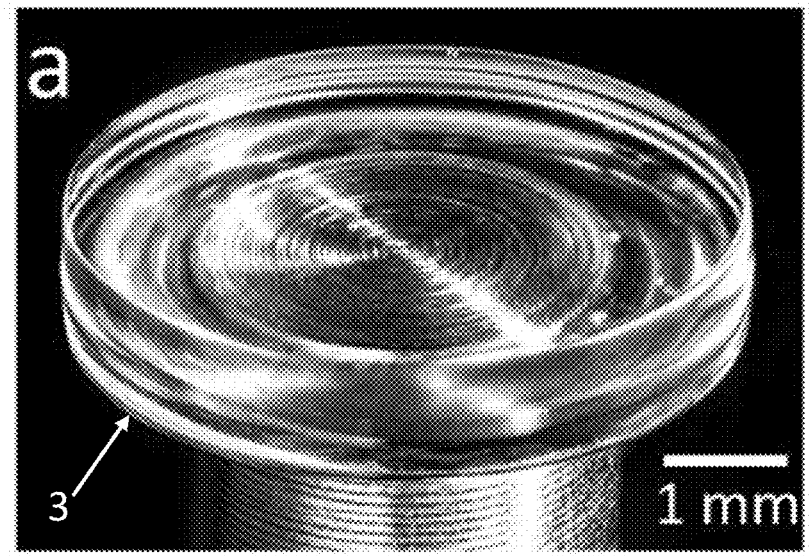
FIGS. 1A to 1E show the principle of spatial multiplexing of solitons in a single microresonator.
Figure 1B:
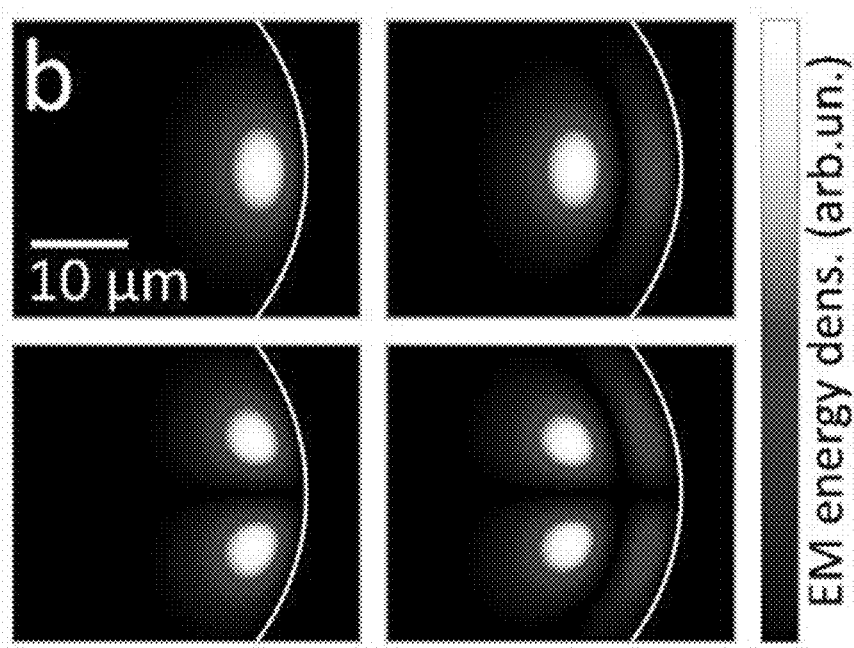
Figure 1C:
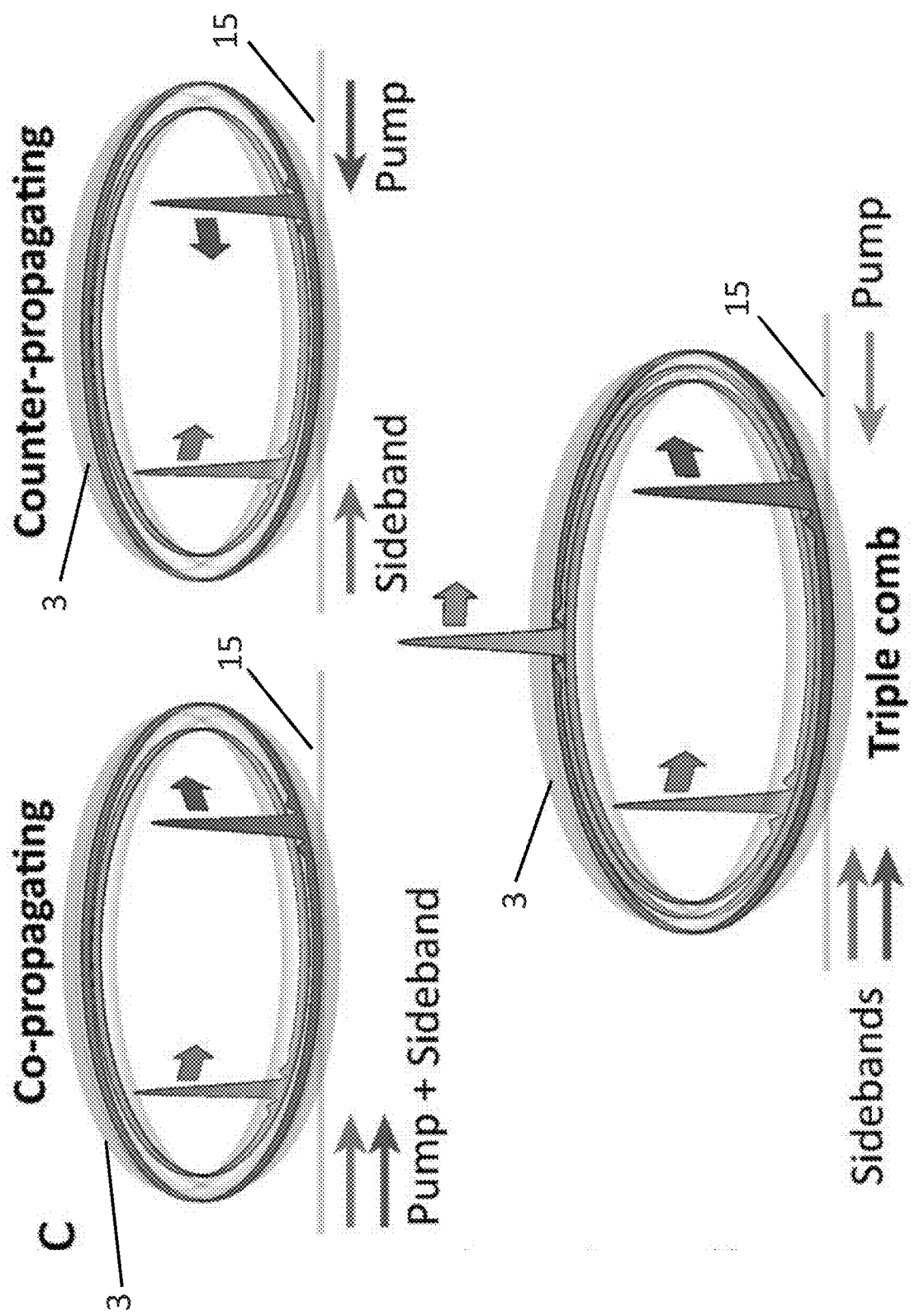
Figure 1D:
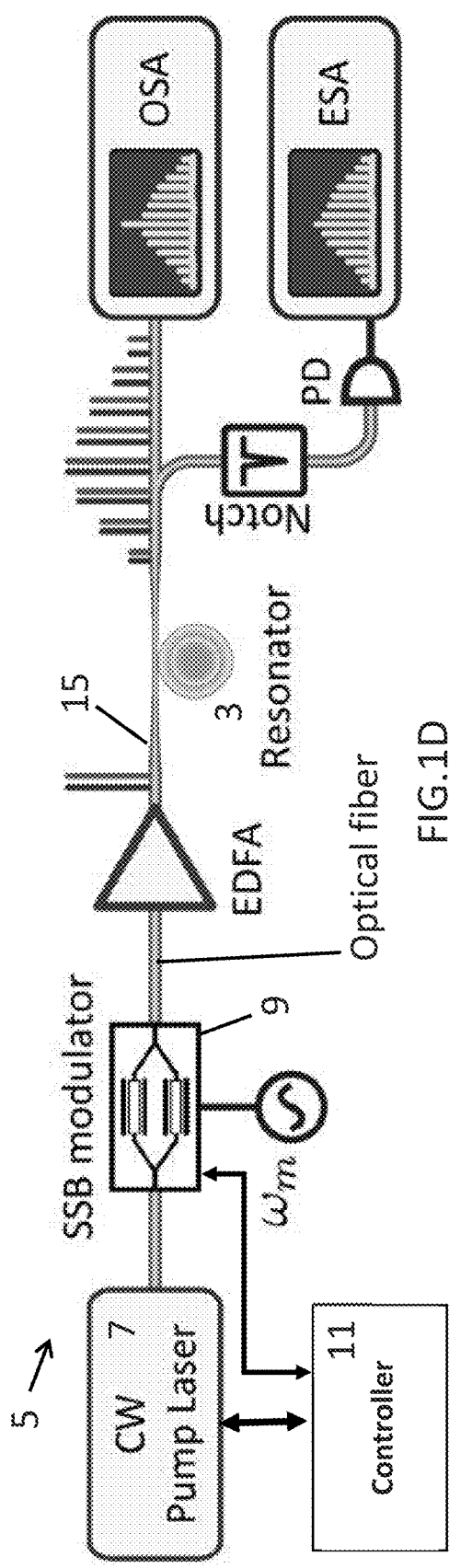

FIG. 1D shows an exemplary setup for dual DKS generation via spatial multiplexing in the co-propagating direction. The single-sideband (SSB) modulator creates an additional carrier to pump a second mode family. EDFA: erbium doped fibre amplifier. E/O-SA: electronic/optical spectrum analyzer.

Figure 1E:
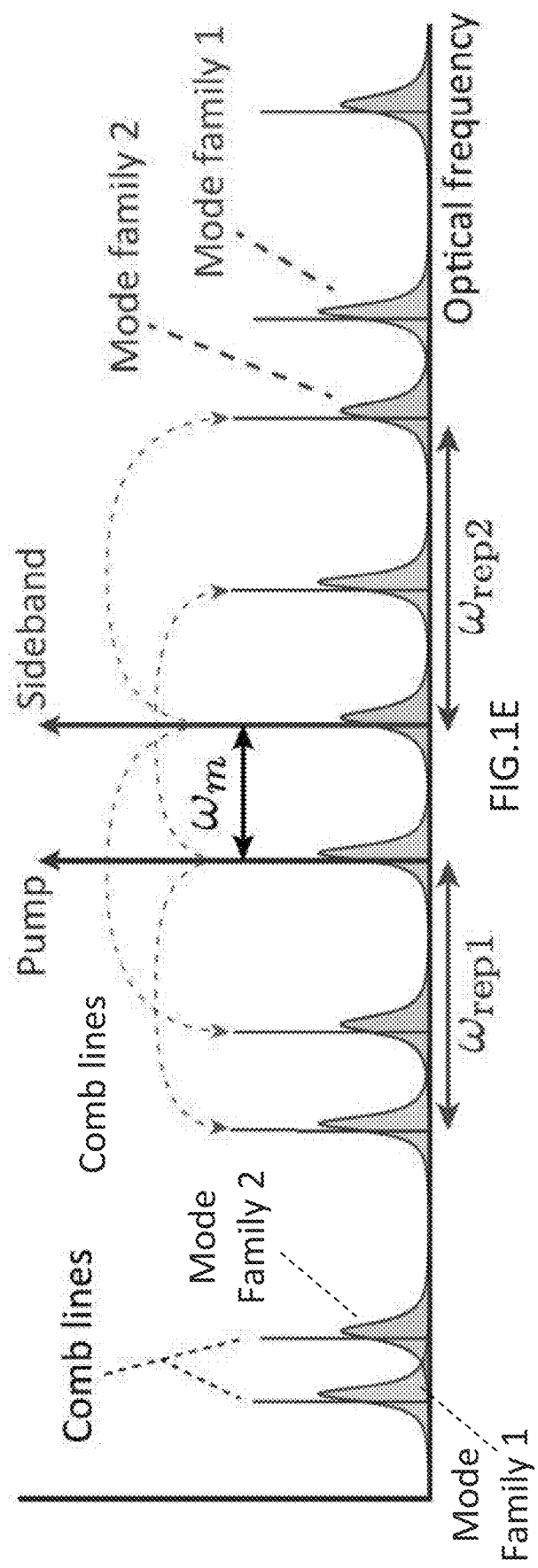

FIG. 1E shows the principle of multiplexed combs generation. The main pump laser is modulated to generate one sideband. The laser and sideband pump one resonance of two different mode families and generate a soliton comb in each of them through the Kerr effect.

FIGS. 2A to 2E show dual-comb generation with spatially-multiplexed co-propagating solitons.

Figure 2A:
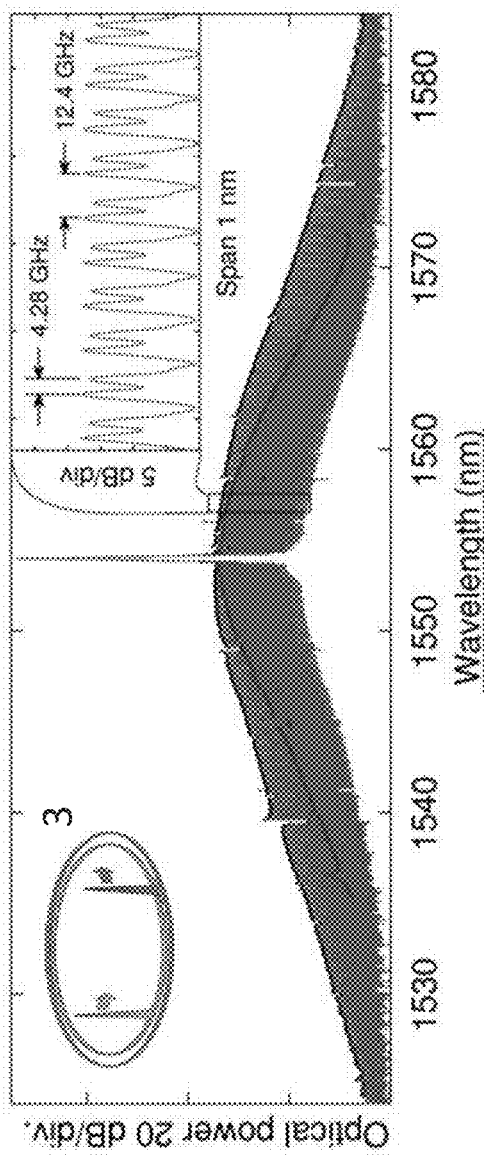
Figure 2B:
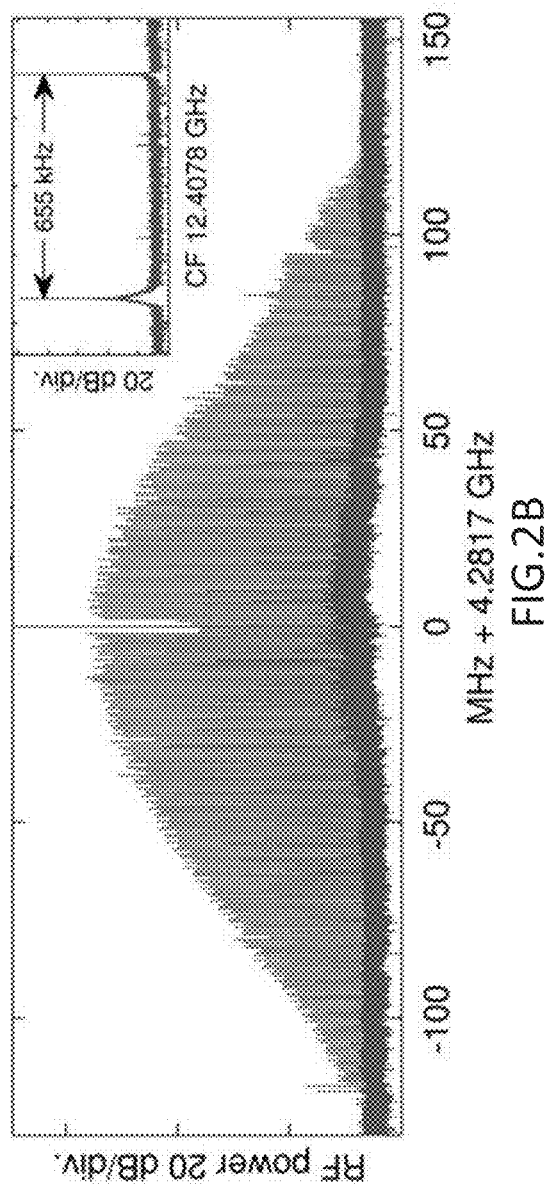

FIG. 2A shows a generated dual-comb optical spectrum. The DKS-based combs are interleaved and spaced by ~4 GHz (see inset). The markers delineate one comb from the other. FIG. 2B shows the resulting dual-comb RF heterodyne beat notes. Resolution bandwidth (RBW): 3 kHz. The line spacing (repetition rate difference shown in inset) is 655 kHz.

Figure 2C:
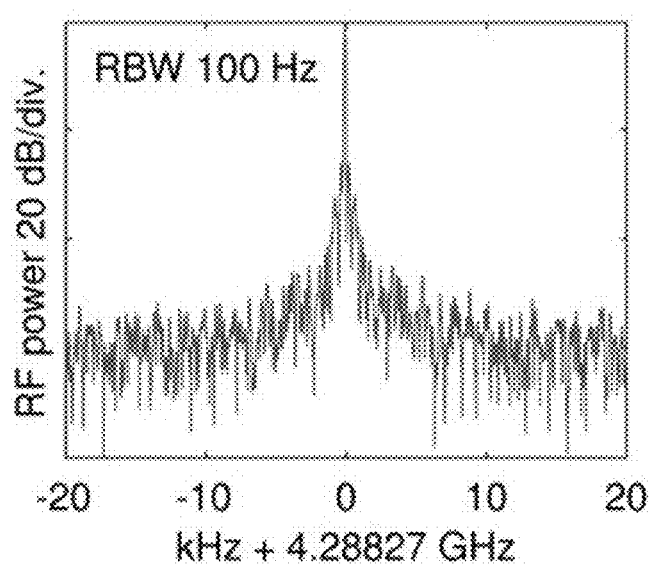

FIG. 2C shows a high-resolution focus of one line of the RF comb in FIG. 2B.

Figure 2D:
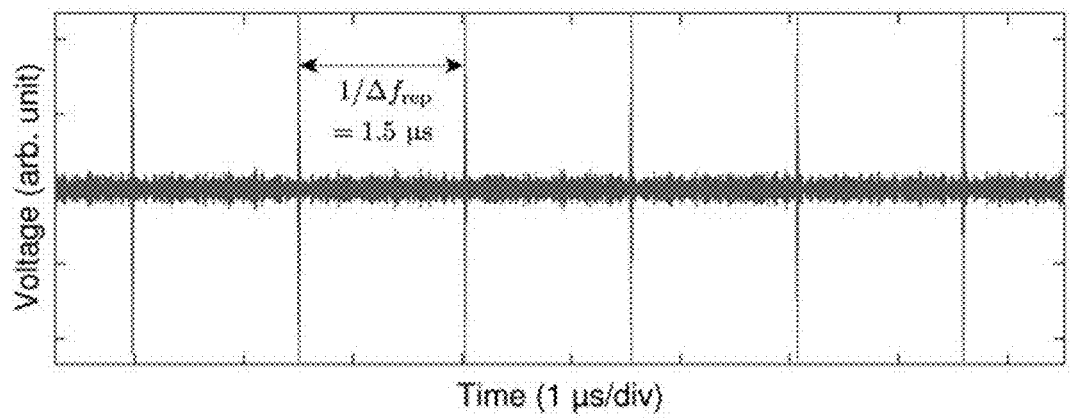

FIG. 2D is a Temporal interferogram of the dual-comb heterodyne shown in FIG. 2B.

Figure 2E:
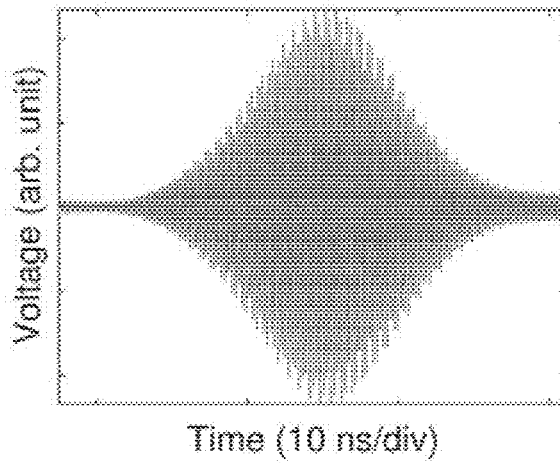

FIG. 2E shows detail of the temporal trace of FIG. 2D when the two pulses overlap (~200× magnification).

FIGS. 3A to 3F show dual-comb generation with spatially multiplexed counter-propagating solitons and proof-of-principle spectroscopy.

Figure 3A:
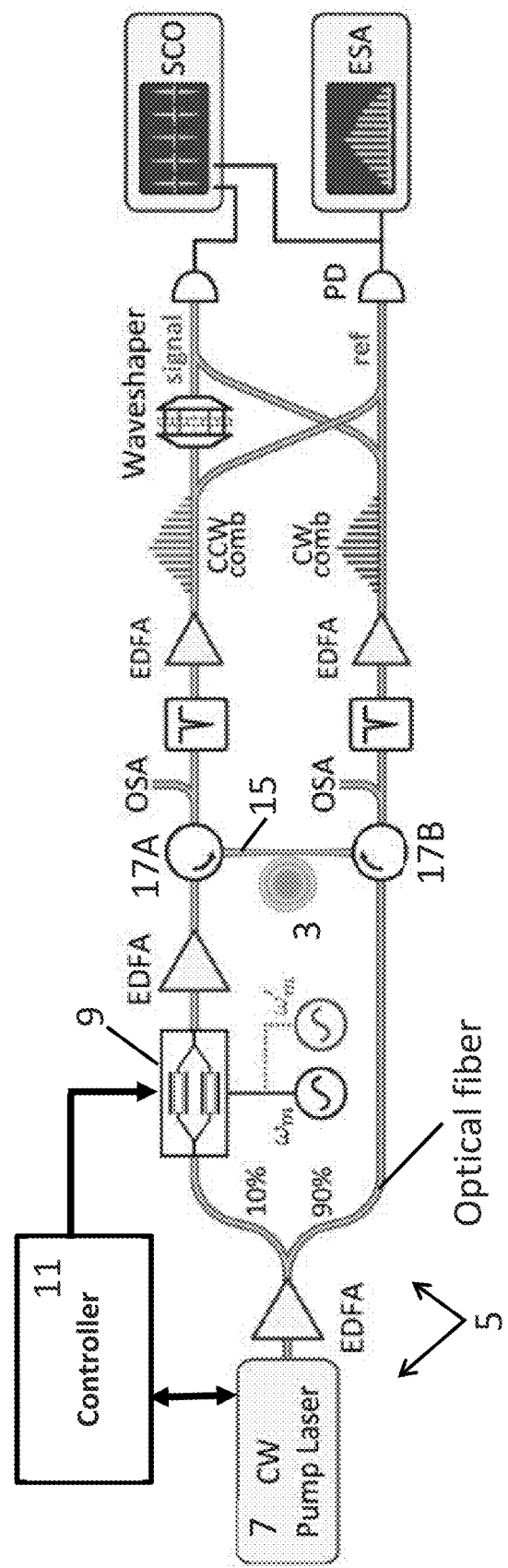

FIG. 3A shows an exemplary setup/system for counter-propagating dual and triple DKS-comb generation and spectroscopy.

Figure 3B:
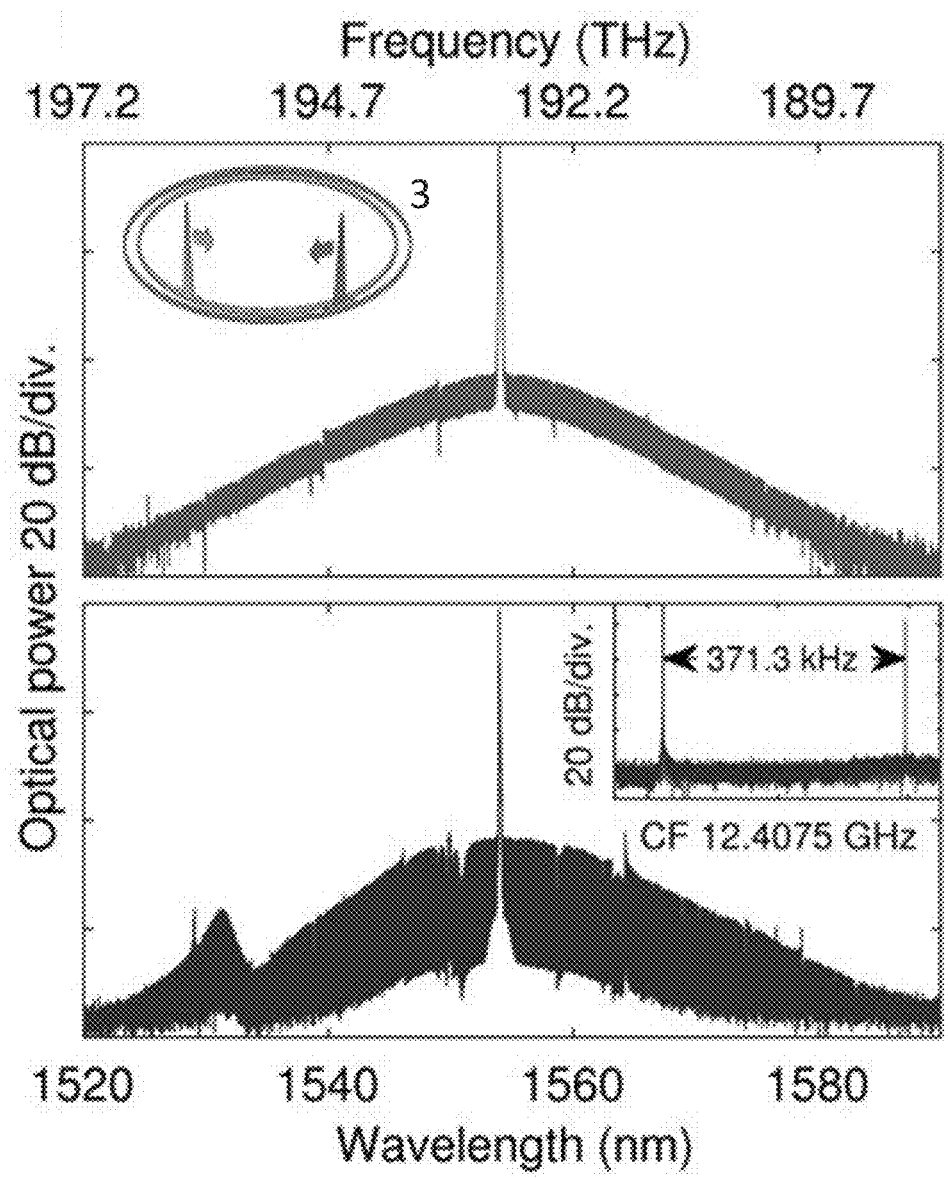

FIG. 3B shows optical spectra of the two counter-propagating combs.

Figure 3C:
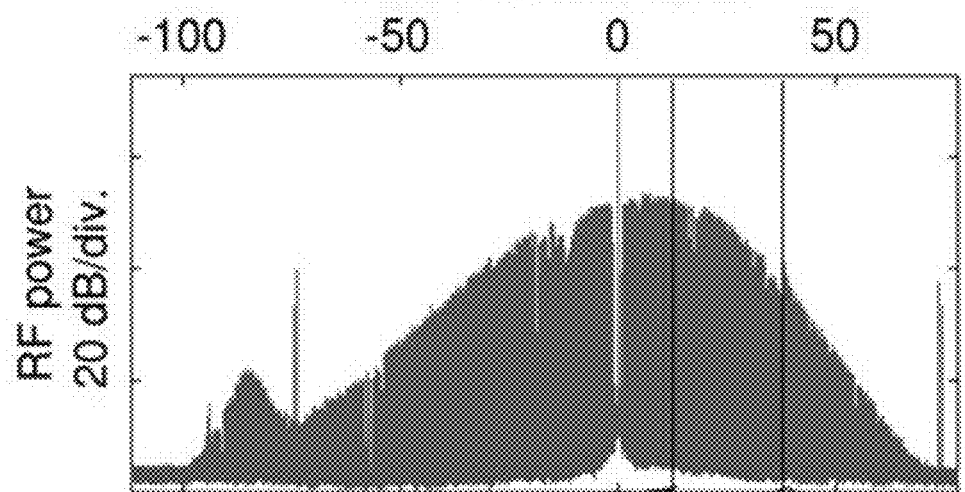

FIG. 3C shows the resulting dual-comb beat note (RBW 3 kHz).

Figure 3D:
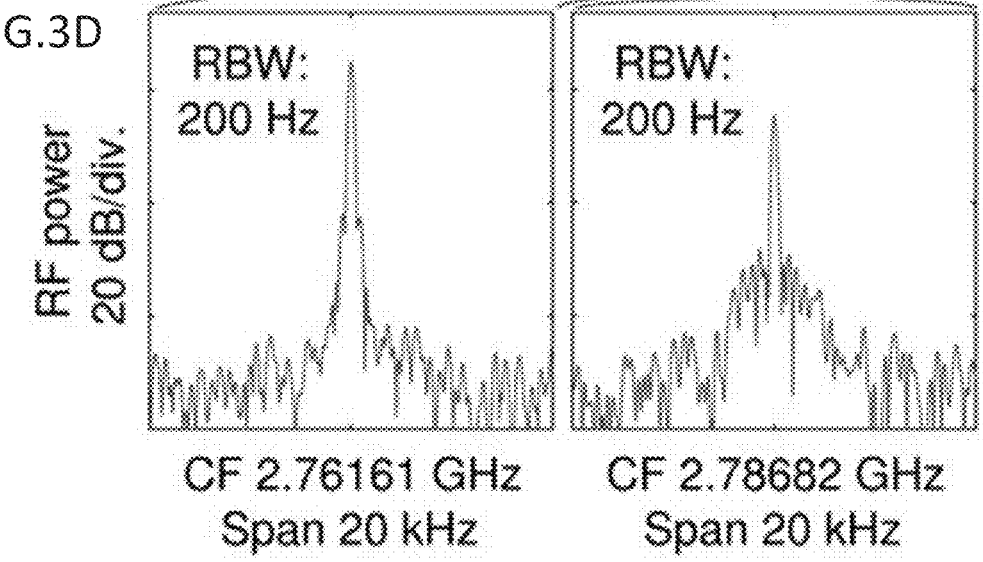

FIG. 3D shows high resolution spectra of two lines of the RF comb in FIG. 3C.

Figure 3E:
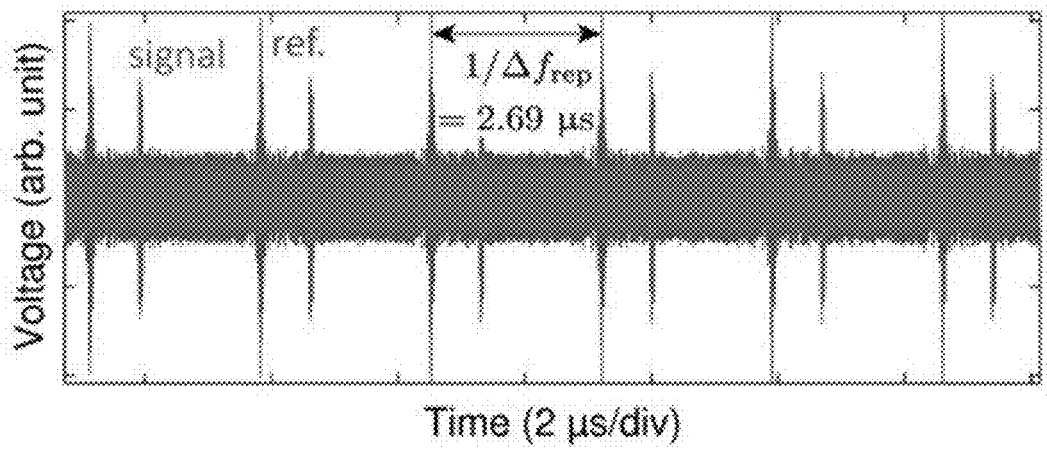

FIG. 3E is a temporal interferogram of the dual-comb heterodyne for the signal path (with waveshaper) and reference path.

Figure 3F:
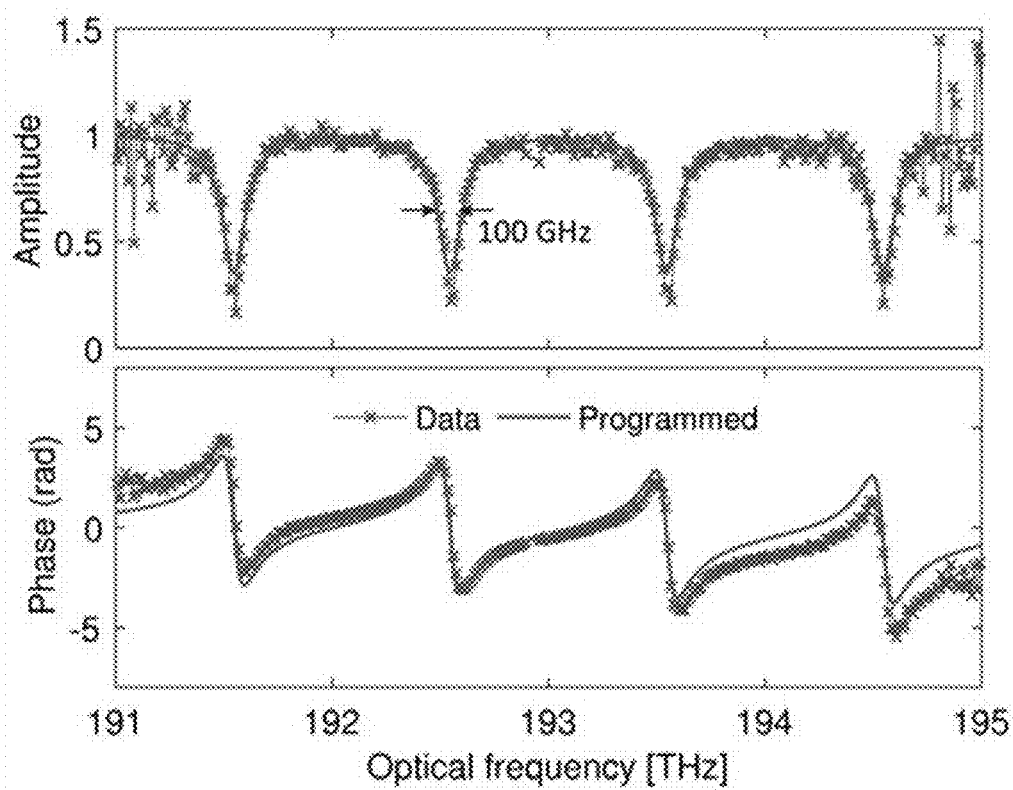

FIG. 3F shows retrieved amplitude and phase of the signal interferogram produced by coupling the dual-soliton pulse trains through a waveshaper programmed with synthetic absorption features (100 GHz FWHM).

FIGS. 4A to 4E show triple comb generation in a single resonator by multiplexing in three mode families.

Figure 4A:
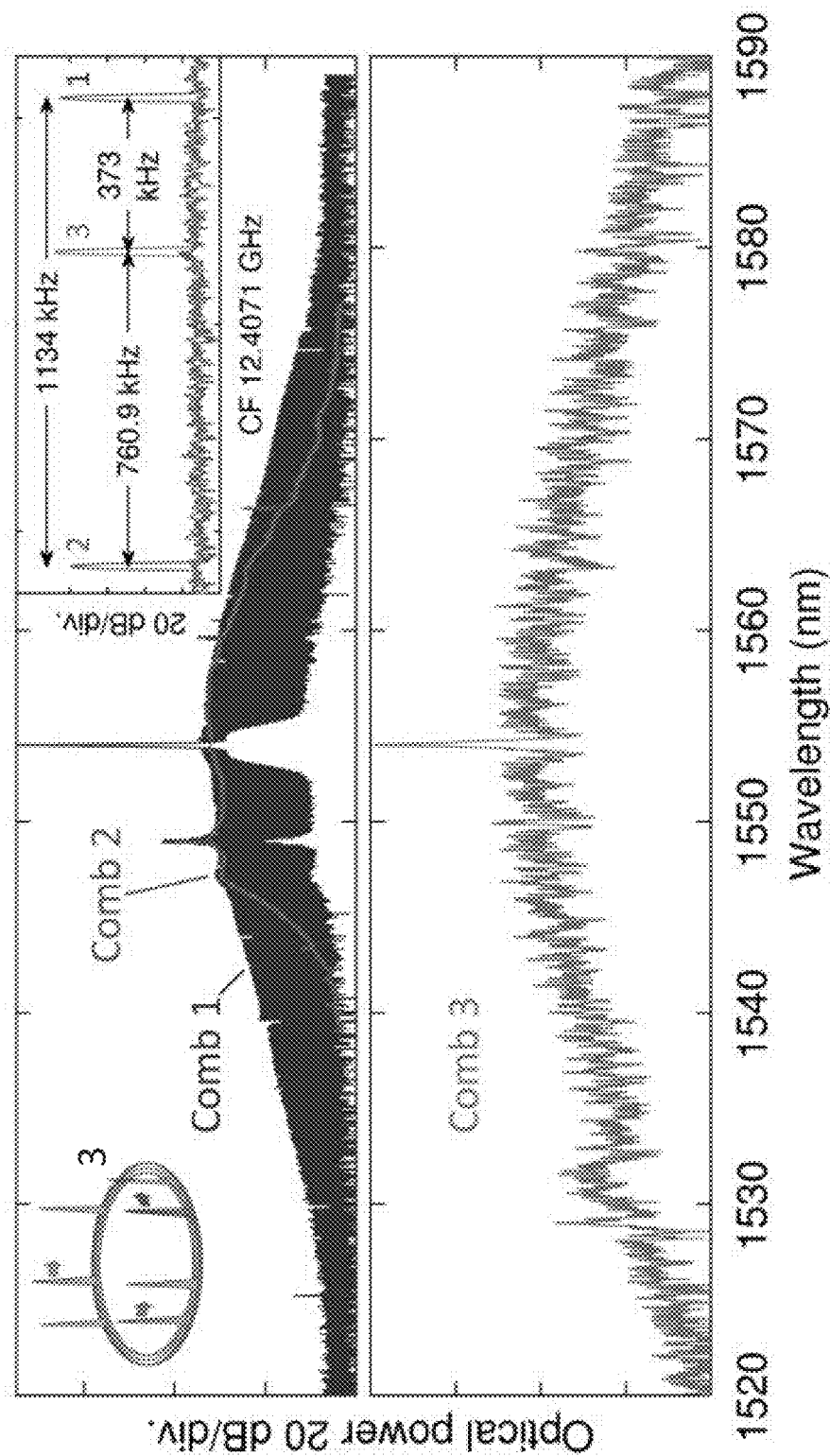

FIG. 4A shows optical spectra where Comb 1 and 2 are generated in the CW direction, while Comb 3 is generated in the CCW direction. The inset shows the three distinct repetition rate beats.

Figure 4B:
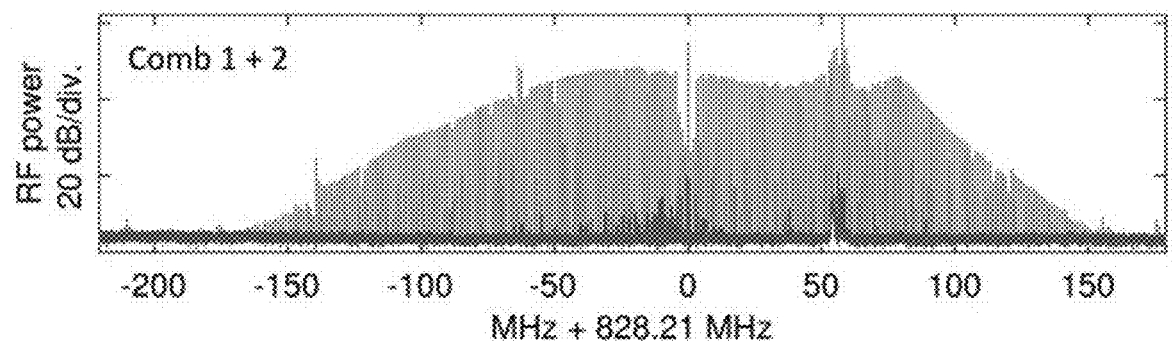
Figure 4C:
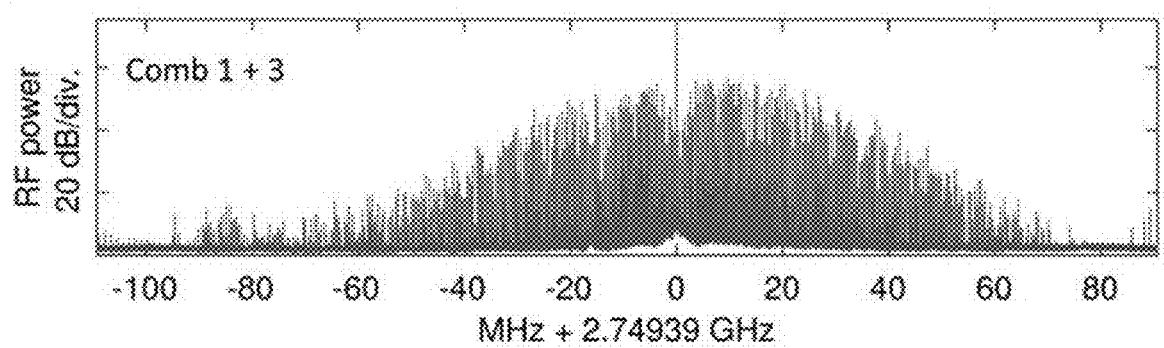
Figure 4D:
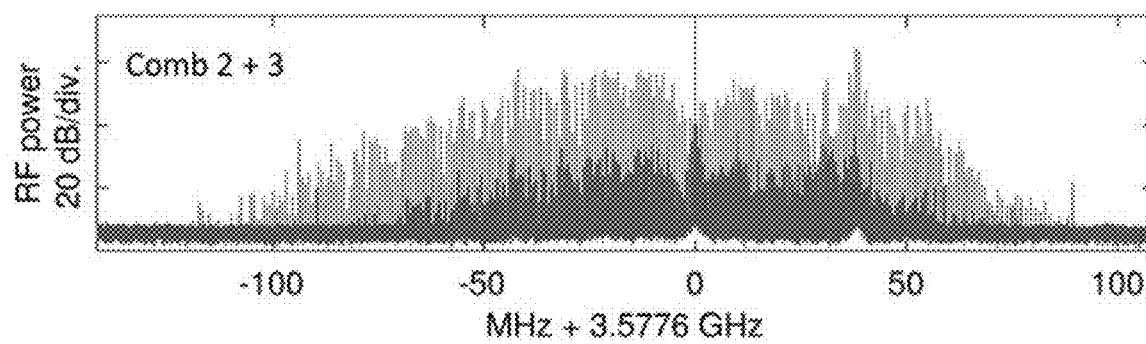

FIG. 4B to 4D shows that heterodyning the three pulse trains on the same photodiode leads to the formation of three RF combs (RBW 3 kHz).

Figure 4E:
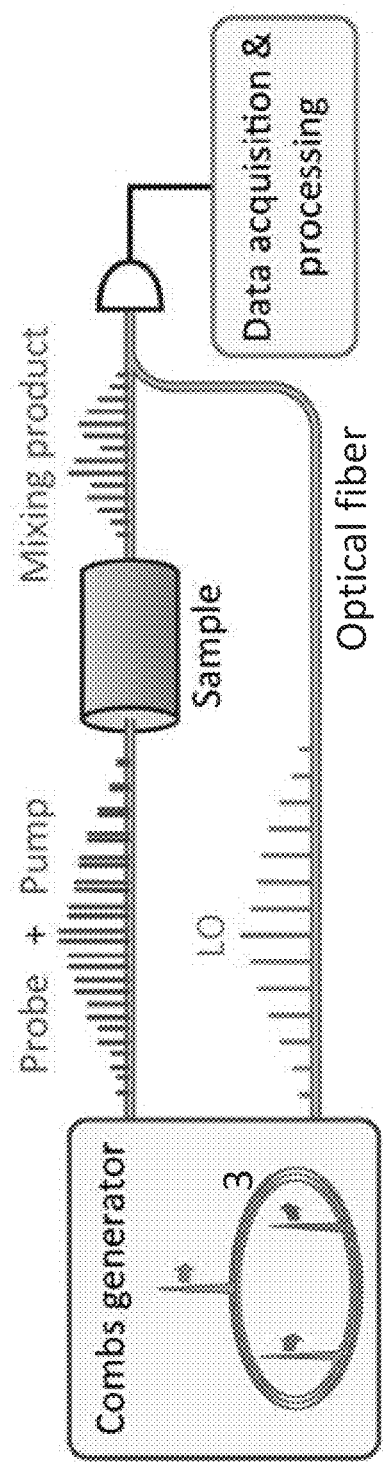

FIG. 4E shows an envisioned application of the triple comb generator for two-dimensional dual-comb spectroscopy.

Figure 5A:
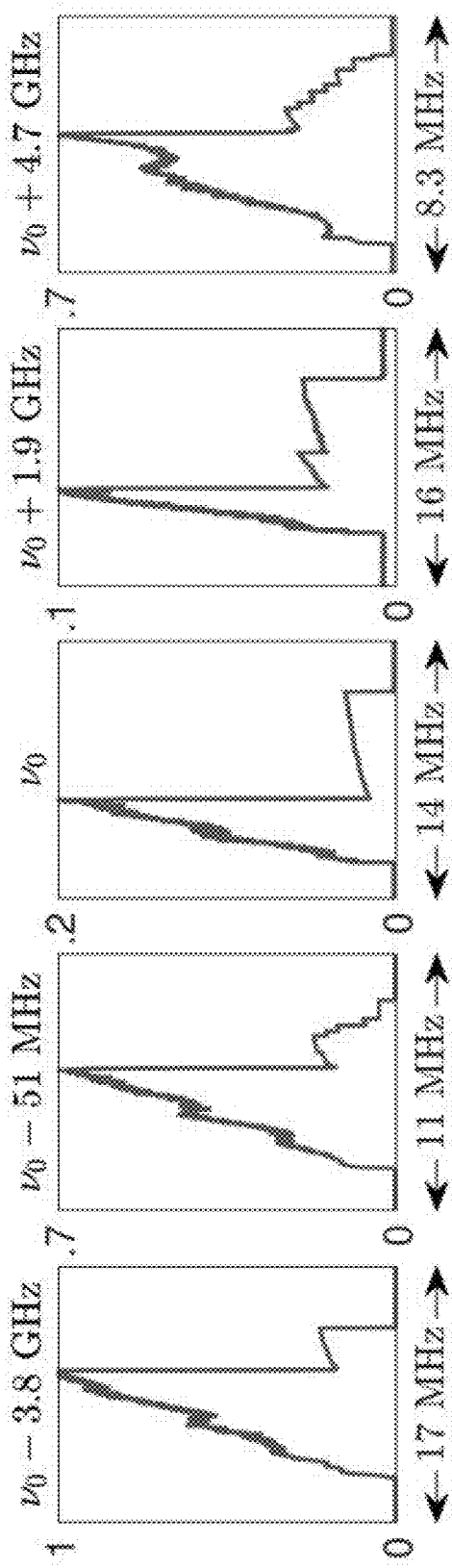

FIG. 5A shows the identification of the soliton-supporting resonance over one cavity FSR. The graphs display the generated comb light at the output of the resonator as the laser frequency is decreased. The step features correspond to the detuning region where solitons exist.

FIG. 5B shows the sequential excitation of two soliton-supporting resonances (in the co-propagating scheme), when the offset frequency is detuned. The left resonance is excited with the pump laser light while the right is excited with the sideband.

FIG. 5C shows that adjusting the sideband shift allows the overlap of the resonances. The region where the two steps coexist corresponds to the formation of the dual DKS comb.

Figure 6A:
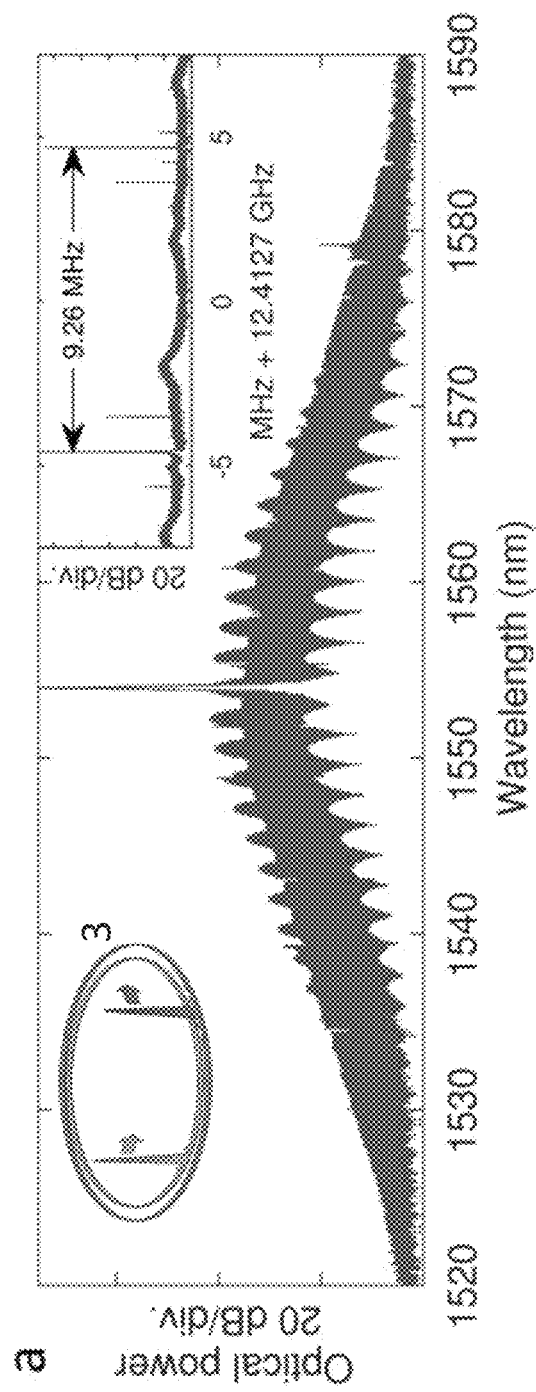

FIG. 6A shows a generated dual-comb optical spectrum in the co-propagating direction. One of the combs corresponds to a two-soliton state and hence has a distinct spectral interference pattern. The repetition rate difference is shown in the inset.

Figure 6B:
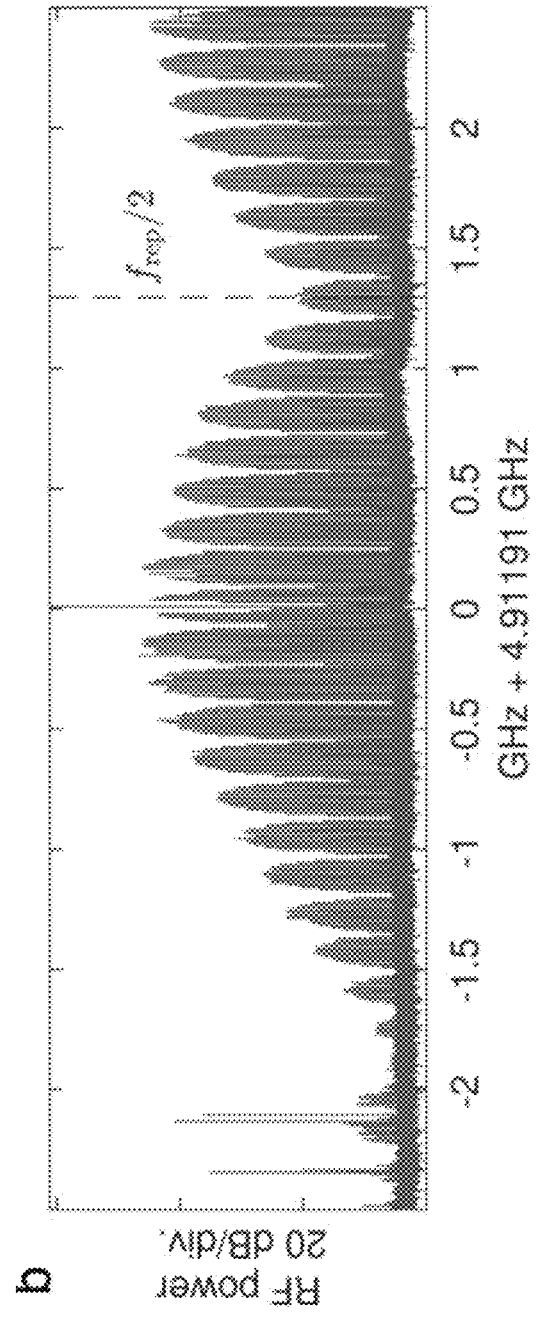

FIG. 6B shows the corresponding RF heterodyne comb.

Figure 7:
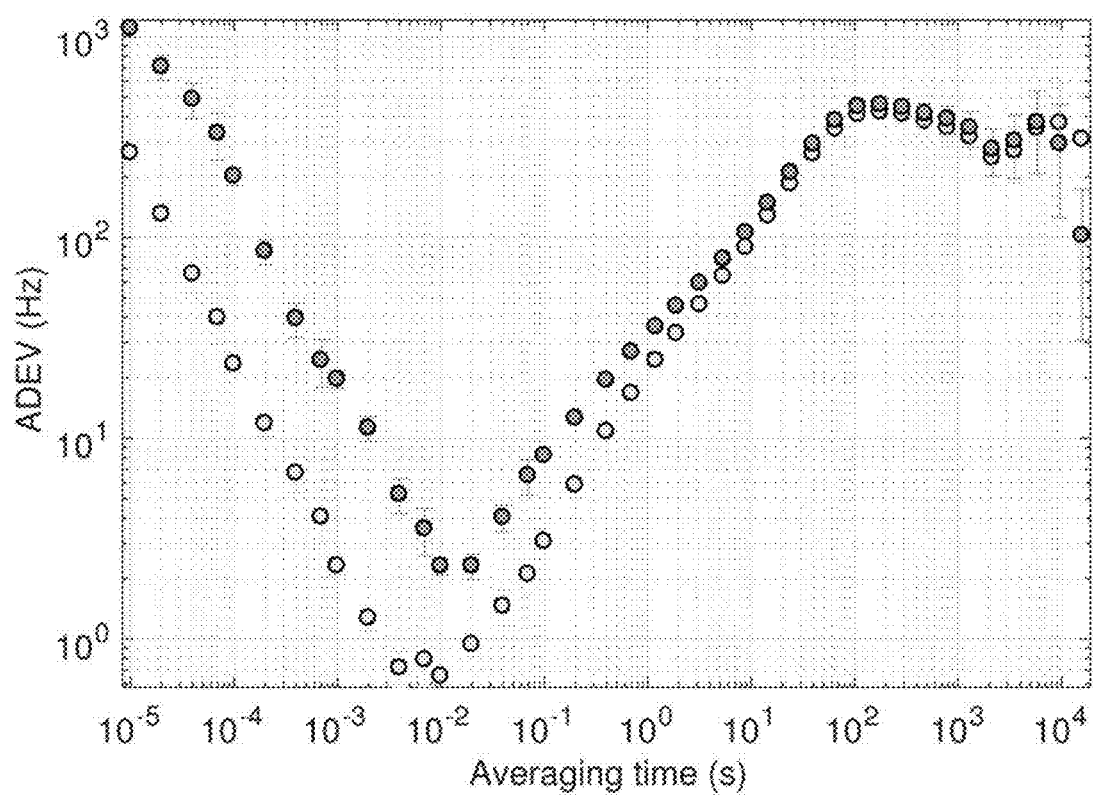

FIG. 7 shows overlapping Allan deviation of the repetition rates (~12 GHz) of two counter-propagating combs.

Herein, identical reference numerals are used, where possible, to designate identical elements that are common to the Figures.

DETAILED DESCRIPTION OF THE SEVERAL EMBODIMENTS

In spatial division multiplexing, different spatial modes of an optical fiber are used as additional parallel channels to transmit data. Due to the constant raise of data traffic, this technique is becoming progressively more relevant, as it can be exploited to increase the capacity of optical fibers, as demonstrated by using few-mode fibers. Similar to optical fibers, optical microresonators in general also exhibit multiple spatial mode families, that can provide additional degrees of freedom in which light can propagate, allowing for example, to fulfil phase matching for second harmonic generation. This disclosure describes a method and device for spatial multiplexing of dissipative Kerr solitons (DKS) in a microresonator, i.e. the simultaneous generation of DKS states in several spatial modes of a resonator.

DKSs are self-localized pulses of light circulating in coherently-driven passive optical resonators with Kerr nonlinearity and spontaneously form in the context of Kerr frequency comb generation.

These solitons, produced through coherent optical excitation or pumping of the optical resonator, generate optical frequency combs (Kerr combs) and allow, for example, to provide a soliton-based frequency comb source that can be used for a wide range of applications.

The present method multiplexes solitons in multiple spatial mode families of a single optical microresonator, pumped simultaneously via, for example, electro-optical modulation and an optical source. DKSs are self-localized pulses of light that can be excited in coherently-driven passive nonlinear optical resonators. Spatial multiplexing permits, for example, dual comb generation in both co- or counter-propagating configurations as well as simultaneous three comb generation. The soliton combs have a high degree of mutual coherence, which is desirable for many dual comb schemes.

Similar to space division multiplexing in fiber optical communication, several independent dissipative Kerr soliton states are generated, i.e. continuously circulating solitonic pulses driven by a light source, in different spatial modes of a microresonator. Spatial multiplexing enabled, for example, the simultaneous generation of up to three different soliton states and thereby generate both dual and triple frequency comb from one device. The resulting combs have excellent mutual coherence and can have substantial repetition rate differences, enabling fast acquisition speed, and allowing effective suppression of intermodulation products.

DKSs are self-localized pulses of light circulating in coherently-driven passive optical resonators with Kerr nonlinearity, and have been observed to spontaneously form in the context of Kerr frequency comb generation. The coherent and broadband properties of DKS-based 'micro-combs' have significantly extended the range of application of Kerr combs, including self-referencing, dual comb spectroscopy, parallel coherent communication, dual comb distance measurement, astrophysical spectrometer calibration, and photonic integrated frequency synthesis. Moreover, DKSs possess rich nonlinear dynamics, covering soliton switching, Raman self-shifting, dispersive waves (i.e. soliton Cherenkov radiation), breather solitons, or soliton crystallization. The impact of higher order spatial modes on DKSs has been studied in the context of avoided mode crossing-induced changes of the soliton comb envelope, repetition rate stability and phase noise performance, Cherenkov radiation, intermode breathing, and Stokes solitons generation. Although pumping of two orthogonally polarized modes was investigated in preliminary works, it remained unexplored if independent soliton states can be generated in distinct spatial modes.

The method and device of the present disclosure permits the simultaneous generation of soliton combs, by pumping for example up to three different spatial mode families of the same polarization using, for example, a laser and modulation sidebands (see, for example, FIG. 1C).

This spatial multiplexing allows not only dual but also triple frequency comb generation from one and the same device, which to date, to the best of the inventors knowledge, has not been achieved with any other laser frequency comb platform (e.g. fiber laser cavities, Ti: Sa, semiconductor mode locked laser).

The distinct free spectral range of the respective mode families prevents intermodulation products, and enables the generation of independent soliton pulse streams with substantial repetition rate differences (for example, 100 kHz-100 MHz). Beyond established dual-comb techniques, the triple frequency comb source can simplify higher dimensional spectroscopy, with the potential to increase information content, accuracy or speed of acquisition. Such triple laser combs could be utilized for 2D coherent spectroscopy, as well as advanced comb-based distance measurement schemes with increased ambiguity range.

While triple comb generation is a new capability of spatially multiplexed DKS, generating two frequency combs directly from a single laser cavity is advantageous, thanks to the reduced system complexity and inherent improvement of the mutual coherence such approach offers.

For example, instead of phase locking two independent conventional laser frequency combs, both combs can be generated in the same laser cavity or spectrally broadened in the same fiber in opposite propagation directions. As the noise sources are common mode, the relative coherence between the combs is significantly improved, allowing for longer coherent averaging. In the field of microcombs, for the initial demonstrations of dual comb applications, pairs of physically distinct yet almost identical resonators were employed to realize dual comb spectroscopy, distance measurements, and coherent telecommunication. Recent works demonstrated the generation of dual-DKS combs with counter-propagating solitons within the same spatial mode of a single microresonator, using the clockwise and counter-clockwise mode degeneracy, and showing a drastic improvement in mutual coherence. However, this technique is limited to counter-propagating pumps and as such requires nonreciprocal elements, i.e. circulators. Moreover, since the same mode family is used, only small relative combs offset can be achieved, while the repetition rates difference is induced via the Kerr and Raman effects and typically moderate. As result, the corresponding RF comb is not centered at sufficiently high frequencies, causing lines near DC to overlap in frequency (a consequence of mapping a portion of the lines to 'negative' RF frequencies). Critically, this implies that spectral information is lost, since several pairs of lines beat at identical RF frequencies. Likewise, the small repetition rate difference restricts the acquisition speed. Finally, the scheme is inherently limited by the twofold degeneracy of whispering gallery modes (WGM), only allowing dual-comb generation.

The spatial multiplexing method and device of the present disclosure overcome these shortcomings, and when combined with counter-propagating pumps, presents a significant potential for applications in dual (or triple) comb spectroscopy. Large repetition rate differences can be obtained, allowing shorter acquisition time. As a single light source (for, example, a coherent continuous-wave laser) and resonator can be used, the resulting combs have thus excellent mutual coherence, and support dual-comb spectroscopy (with amplitude and phase retrieval) in spite of using a free running system. The larger offset between combs prevents mapping ambiguity, and soliton interactions and locking. The multiplexing can also be performed in co- or counter-propagating directions. Finally, the scalability is demonstrated with the generation of three combs in a single resonator.

The multiple soliton comb generator or device or system 1 of the present disclosure comprises a single optical resonator 3 configured to support a plurality of independent or distinct spatial modes in which light can propagate and an optical pump source 5 for simultaneously optically pumping a plurality of distinct spatial modes of the optical resonator 3 to generate independent soliton states in the optically pumped distinct spatial modes of the single optical resonator 3 and to generate a plurality of frequency combs.

The optical resonator 3 may, for example, consist of a whispering gallery mode resonator, a waveguide resonator, or a ring resonator. For example, the optical resonator may comprise a waveguide such as that disclosed in patent application US2016/0327743 the entire contents of which are incorporated herein by reference.

The optical resonator 3 may, for example, comprise or consist solely of a crystalline or non-crystalline microresonator. The crystalline microresonator may, for example, comprise or consist solely of a fluoride crystalline material or an alkaline earth metal fluoride. The crystalline microresonator may, for example, comprise or consist solely of Magnesium Fluoride, Calcium Fluoride, Strontium Fluoride, Barium Fluoride, or Lithium Fluoride or Lithium Niobate or Lithium Tantalite. The non-crystalline microresonator may, for example, comprise or consist solely of $SiO_2$. Alternatively, the optical resonator 3 may, for example, comprise or consist solely of Silicon nitride ($Si_3N_4$) or Aluminum Nitride (AlN) waveguide or ring resonator.

The optical pump source 5 includes, for example, a light source 7 such as a laser and a modulation sideband generator 9. The optical pump source 5 can include, for example, a single laser 7 and/or a single modulation sideband generator 9.

The modulation sideband generator 9 is configured to generate at least one modulated optical sideband using the laser light. The laser light and the optical sideband emission have different optical frequencies or wavelengths. The modulation sideband generator 9 includes or consists of, for example, an electro-optical modulator, a single-sideband modulator, a DQPSK modulator or an IQ-modulator. The optical sideband emission can be produced via electro-optical modulation. The light source 7 comprises or consists of a continuous wave (CW) laser 7, for example, a laser diode or external cavity diode laser.

The optical pump source 5 is configured to generate a single optical sideband for optically pumping a spatial mode of the optical resonator 3. The optical pumping frequencies or wavelengths of the laser and optical sideband emission preferably match soliton-supporting resonances of the optical resonator 3.

The generator 1 may optionally further include a controller 11 configured to scan the laser emission wavelength of the laser to trigger soliton formation simultaneously in the plurality of distinct spatial modes. The controller 11 can be, for example, configured to tune the laser emission wavelengths across the resonances of the optical resonator 3 using current or piezoelectric-actuator tuning. The controller 11 can include a current controller for varying the drive current applied to the laser to carry out the laser wavelength tuning. Alternatively or additionally, the controller 11 may control a piezo-actuator or piezoelectric transducer to vary the emission wavelength of the laser emission, for example, when the piezo-actuator or piezoelectric transducer is comprised in an External cavity diode laser ECDL to control a dispersive device such as a diffraction grating located in the external optical cavity. The controller 11 may alternatively or additionally be connected to the modulation sideband generator 9 and configured to adjust a modulation frequency and the bias voltage applied to the modulation sideband generator 9 for generating the optical sideband emission. The control 11 is thus configured to trigger simultaneous soliton formation in the plurality of distinct spatial modes.

The generator 1 can also include at least one coupler 15. The coupler 15 can be for example an optical coupler such as an optical waveguide or tapered optical fiber located in proximity to the optical resonator 3 to permit optical coupling of light to and from the optical resonator 3. The coupler 15 is configured to permit light to evanescently coupled to and from the optical resonator 3.

The optical resonator 3, the optical pump source 5 and the coupler 15 can be arranged so that the laser light and the at least one modulated optical sideband co-propagate in the same direction in the optical resonator 3.

In FIG. 1D, for example, the laser light and the modulated optical sideband is provided to and extracted from the optical resonator 3 using a tapered optical fiber. The laser 7 may, for example, provide light to the modulation sideband generator 9 via an optical fiber. The modulation sideband generator 9 is configured to provide both the laser light emission (carrier) and the optical sideband emission to the resonator 3 via an optical fiber tapered in the region that is in proximity to the optical resonator 3 so that the laser light and the modulated optical sideband co-propagate in the same direction in the optical resonator 3.

In another embodiment, the generator 1 may include the at least one coupler 15, and first and second circulators 17A, 17B (FIG. 3A). The circulator 17A, 17B may comprise or consist of an optical or fiber-optic circulator.

The optical resonator 3, the optical pump source 5, the coupler 15 and the first and second circulators 17A, 17B are arranged so that the laser light and the at least one optical sideband emission counter-propagate in opposite directions in the optical resonator 3.

For example, the laser 7 can provide light to one of the circulators 17A,17B that is coupled to one input of the coupler 15 permitting to input the laser light into the optical resonator 3 for propagation in a first direction. Fiber coupling to the circulator may be used or alternatively, free space coupling may be employed. The optical sideband emission can be provided to the other one of the circulators 17A,17B that is coupled to another input of the coupler 15 permitting to input the optical sideband emission into the optical resonator 3 for propagation in a second direction that is opposite direction or in a counter-propagating direction to that of the first direction. Fiber coupling to the circulator may also be used or alternatively, free space coupling may be employed.

The first and second circulators 17A, 17B are preferably further configured to collect the generated frequency combs generated inside the optical resonator 3 from the coupler 15.

The modulation sideband generator 9 can also be configured to generate first and second modulated optical sidebands using the laser light. The coupler 15 and the first and second circulators 17A, 17B are optically arranged (for example, as shown in FIG. 3A or described above) so that the laser light, the first optical sideband emission, and the second optical sideband emission optically pump first, second and third distinct spatial modes of the optical resonator 3 to simultaneously generate first, second and third independent soliton states and generate first, second and third frequency combs.

The optical pump source 5 can also be configured to generate light emission for pumping additional distinct spatial modes of the optical resonator 3 to simultaneously additional frequency combs. For example, the modulation sideband generator 9 can be configured to generate additional modulated optical sidebands using inputted laser light.

The laser light can be coupled to the optical resonator 3 to propagate in a first propagating direction in the optical resonator 3, and the first and second optical sideband emission can be coupled to the optical resonator 3 to propagate in a second propagating direction in the optical resonator 3. The first and second propagating directions are opposite directions, for example a clockwise (CW) and counter clockwise direction (CCW). The (i) laser light and (ii) the first and second modulated optical sidebands can for example propagate in clockwise and counter-clockwise directions respectively, or counter-clockwise and clockwise directions respectively inside the optical resonator 3. An input of the first circulator 17A, 17B may receive the two optical sideband emissions from the modulation sideband generator 9 and simultaneously provide them both to the optical resonator 3 via the coupler 15. A second circulator 17A, 17B may receive the laser emission at a different input and provide it to the optical resonator 3 via the coupler 15.

Two frequency combs are generated in the second propagating direction, and one frequency comb is generated in the first propagating direction. The first and second circulators 17A, 17B can also be configured to collect the generated first, second and third frequency combs from the coupler 15.

The pumped plurality of different distinct or independent spatial modes of the single optical resonator 3 are spatial modes of the same polarization or alternatively of different polarization.

The solitons generated in the optical resonator are dissipative Kerr soliton. The optical resonator is for example a non-linear optical resonator.

The generator 1 may optionally include one or more light amplifiers to amplify the optical signal, for example, erbium-doped fiber amplifier amplifiers (EDFA) (see, for example, FIGS. 1D and 3A).

The multiple soliton comb generation method of the present disclosure includes, providing the single optical resonator 3 configured to support a plurality of distinct spatial modes in which light can propagate, providing an optical pump source 5, and simultaneously optically pumping a plurality of distinct spatial modes of the single optical resonator to simultaneously generate independent soliton states in the distinct spatial modes and generate a plurality of frequency combs.

Optical pumping of a first distinct spatial mode of the single optical resonator 3 to generate solitons in a first independent soliton state in the first distinct spatial mode can be carried out to generate a first frequency comb. Optical pumping a second distinct spatial mode of the optical resonator to simultaneously generate solitons in a second independent soliton state in the second distinct spatial mode can be carried out to generate a second frequency comb. Similarly, optical pumping of a third and/or further distinct spatial mode of the single optical resonator 3 to generate solitons in a third and/or further independent soliton state in the third and/or further distinct spatial mode can be carried out to generate a third and/or further frequency comb.

The optical pumping is carried out, for example, using light from the laser 7 and one or more modulated optical sideband is generated by the modulator 9 using the laser light, where the laser light and the one or more modulated optical sideband have different optical frequencies or wavelengths. The optical frequencies or wavelengths preferably match soliton-supporting resonances of the single optical resonator 3.

Scanning of the laser emission wavelength can be carried out to trigger soliton formation simultaneously in the spatial modes. The laser 7 is for example tuned across the resonances using current or piezo-actuator tuning. Additionally or alternatively, a modulation frequency that generates the modulated optical sideband can be adjusted to trigger simultaneous soliton formation in the spatial modes.

To generate, for example, a dual-comb, the carrier or the laser light emission optical frequency provided to the modulator 9 is not fully suppressed by the modulator 9 such that the carrier and the optical sideband emission have substantially the same optical power level. The laser light and the generated modulated optical sideband are both simultaneously provided to the optical resonator 3 via the coupler 15 and co-propagate in the same direction in the single optical resonator 3.

The laser light and the modulated optical sideband may alternatively be provided to the optical resonator 3 in order to permit counter-propagation in opposite directions in the single optical resonator 3. For this, the laser light is, for example, provided to the first circulator 17A, 17B and coupled to the optical resonator 3 by the coupler 15 after being inputted to the coupler 15 via one end/input of the coupler 15. The optical sideband emission is provided to the second circulator 17A, 17B and coupled to the optical resonator 3 after having been inputted to the coupler 15 via another end/input of the coupler 15. The laser light and the modulated optical sideband may for example propagate in clockwise and counter-clockwise directions respectively, or counter-clockwise and clockwise directions respectively.

To implement the counter-propagation directions in the single optical resonator 3, the modulator 9 is for example configured to suppress the carrier signal inputted thereto during the generation of the one or more optical sideband emissions.

For a dual-comb, a single modulation sideband is generated for optically pumping one distinct spatial mode of the optical resonator 3, this spatial mode being different to the spatial mode pumped by the laser light at the optical frequency of the laser.

The modulator 9 is configured to provide first and second modulated optical sidebands, and/or further optical sideband emissions. The laser emission, the first modulated optical sideband, and the second modulated optical sideband optically pump first, second and third distinct spatial modes of the single optical resonator 3 to simultaneously generate first, second and third independent soliton states and generate first, second and third frequency combs.

The laser light can be coupled to the single optical resonator 3 to propagate in a first direction in the single optical resonator 3, and the first and second modulated optical sidebands can be coupled to the single optical resonator 3 to propagate in a second direction in the single optical resonator, the first and second directions being opposite directions. Two frequency combs are generated in the second propagating direction, and one frequency comb is generated in the first propagating direction. The laser light can be coupled, for example, to the optical resonator 3 using the first circulator 17A, 17B, and the first and second modulation sidebands can be coupled to the optical resonator 3 using the second circulator 17A, 17B. The first and second circulators 17A, 17B can also collect the generated first, second and third frequency combs. The (i) laser light and (ii) the first and second modulation sidebands can propagate in clockwise and counter-clockwise directions respectively, or counter-clockwise and clockwise directions respectively.

A single optical resonator 3 is provided and the soliton states are generated therein by the inputted light. The frequency combs are generated in the optical resonator 3. The spatial modes are different or distinct spatial modes of the optical resonator 3. The spatial modes of the optical resonator 3 are simultaneously pumped. The optical resonator 3 is configured to support a plurality of independent spatial modes in which light can propagate.

The spatial optical modes are of the same polarization, or the spatial modes have orthogonal polarizations.

A single light source 7 can be provided. The optical resonator 3 and/or the light source 7 can be integrated on-chip or contained on a photonic integrated circuit.

The method can be used to carry out two-dimensional comb spectroscopy or distance measurement by using two of the frequency combs generated and/or provided by the optical resonator 3 as pump and probe pulse trains that are mixed in a sample, or sent onto a target and heterodyning the mixing result or the back-reflected light of the target with the third comb generated and/or provided by the optical resonator 3.

To demonstrate the method and device 1 of the present disclosure, the Inventors take advantage, for example, of the optical resonator 3 that is a whispering gallery mode optical resonator and the multi-mode nature of a crystalline WGM cavity (FIG. 1A). The exemplary crystalline WGM cavity is a crystalline $MgF_2$ WGM cavity. Using advanced micro-machining techniques, few mode or single mode cavity protrusions have been demonstrated. However, the fabrication of crystalline cavities by diamond turning and subsequent polishing with diamond slurries leads typically to multimode resonators with several mode families reaching ultrahigh quality factors (Q) exceeding $10^9$. The exemplary resonator 3 used to demonstrate the method and device of the present disclosure has a free spectral range (FSR) of 12.4 GHz, and features up to 5 mode families with the same polarization that sustain DKS formation ($Q \geq 10^9$), as shown in FIGS. 5A and 5B.

Spatial Multiplexing with Co-Propagating Pump Fields

In this exemplary implementation of the method (FIG. 1D, 1E), simultaneous pumping of two soliton-supporting resonances is achieved via electro-optical modulation. The light of an initial pump laser 7 (for example, an external cavity diode laser, for example at a wavelength of 1554 nm) passes through an IQ-modulator 9 to generate a single sideband, without fully suppressing the carrier, such that both reach the same power level. This creates two mutually phase-coherent carriers with a tunable frequency offset. The modulation frequency is set to for example to $f_m = \omega_m/2\pi \sim 4.28$ GHz to match the separation of two soliton-supporting resonances, which belong to different spatial mode families but have the same polarization.

The 'laser scanning technique' (see reference 12, for example, fully incorporated herein by reference) is subsequently applied on the main pump laser to trigger DKS formation in both mode families simultaneously. A successful tuning while possible is however challenging as each resonance induces a thermal shift. This is mitigated in two ways: the laser 7 is tuned across the resonances, using for example the diode current, which allows tuning speeds faster than the thermal relaxation time of the cavity (typically ms timescale). Second, the modulation frequency $f_m$ is carefully adjusted so that the 'high detuning end' of the soliton step approximately coincide (FIG. 5B). The Inventors observed that this maximizes the chance of a successful tuning, and allows for simultaneous dual DKS initiation. After generation, the main laser can be locked to the microresonator 3 (via, for example, offset Pound-Drever-Hall locking (see for example reference 35, fully incorporated herein by reference)) and the dual-DKS combs can be stably maintained for more than 12 hours.

In this manner two simultaneous streams of DKSs are produced. The optical spectrum of the microresonator output (FIG. 2A) shows the two interleaved DKS combs offset by $f_m$. The repetition rates of the two combs differ by $\Delta f_{rep}$=655 kHz (around 12.4 GHz). This corresponds to a relatively small spectral compression factor, of m=$f_{rep}/\Delta f_{rep}$=1.8×10$^4$, which is useful to increase the acquisition speed of a moderate optical span. The beating of the dual-comb results here in an RF comb centered at $f_m$=4.28 GHz. Owing to this high offset frequency, no spectral information is lost and the total ~200 MHz span of the RF comb maps into the corresponding 3 THz of optical span. No signs of solitons interactions were observed. The individual lines of the RF comb are still resolution-limited at 100 Hz bandwidth, although the system is free running.

Another pair of mode families can be selected to achieve a larger repetition rate difference if a faster acquisition is targeted (see FIGS. 6A and 6B, d $f_{rep}$=9.3 MHz, compression m=1.4×10$^3$). These measurements and results illustrate the flexibility of the technique and method of the present disclosure and its potential to substantially increase the bandwidth of the dual-comb interferogram and the acquisition speed, in comparison to prior schemes with counter-propagating solitons. Although a collinear dual comb is not suitable for all schemes, copropagating soliton generation simplifies the device/system setup considerably, as it does not require nonreciprocal devices. Nonetheless, since large comb offsets $f_m$ are possible, two combs generated here could be isolated via de-multiplexing. Implementing this should be straightforward for integrated micro-resonators with larger FSR (>100 GHz), where the offset can be increased beyond 25 GHz.

Spatial Multiplexing in the Counter-Propagating Configuration

Alternatively, the two spatial mode families can be excited in a counter-propagating way, analogous to previous implementations. First, the pump laser 7 is split unevenly between two paths. A pair of devices, such as circulators, is then used to couple light into the resonator and to collect the transmitted combs on both sides (FIG. 3A to 3F). For example, 90% of the pump power is coupled directly into the counter-clockwise (CCW) direction. In the other path, the remaining 10% of the pump is sent through a single sideband modulator 9 operated in carrier-suppressing mode to frequency-shift the light by the offset separating the two resonances. After amplification, the frequency-shifted light is coupled in the clockwise (CW) direction.

Another exemplary set of mode families was used whose resonance offset is $f_m$=2.75 GHz, and the repetition rate difference is $\Delta f_{rep}$=371 kHz to demonstrate the counter-clockwise spatial multiplexing of DKSs. The soliton formation is triggered in the same way as in the co-propagating case. The two generated single-soliton combs are shown in FIG. 3, and the corresponding RF comb (FIG. 3) features a similar degree of stability to the co-propagating scheme, with 200 Hz wide beat notes throughout the RF comb (FIG. 3D). The main advantage of the counter-propagating pump configuration is that the combs can be accessed individually, which makes the method compatible with a wide range of dual-comb applications.

As a proof of concept spectroscopy experiment, one comb is sent through a waveshaper before interfering with the second comb. The beating is recorded on a high sampling rate oscilloscope (1 ms acquisition time, corresponding to ~370 averages). The amplitude and phase of the RF comb teeth are compared to a reference signal recorded without the waveshaper. FIG. 3F shows that the retrieved amplitude and phase closely match the programmed synthetic resonance profiles over a span of 4 THz.

Triple Soliton Combs Generation Via Spatial Multiplexing

Multiplexing three soliton combs, by pumping three mode families simultaneously is also possible according to the method and device of the present disclosure. The counter-propagating configuration is employed but combined for example with an additional tone $f_m'=\omega_m'/2\pi$=3.58 GHz on the modulator (FIG. 3). This allows two mode families to be co-pumped, and thus the creation of two combs in the CW direction, while another comb is generated (FIG. 3) by pumping a third mode family in the CCW direction. Remarkably, the excitation technique outlined earlier, was also applied successfully to generate all three combs (FIGS. 4A to 4D).

In this embodiment, the CW combs (1 and 2) correspond to single-soliton states, while the CCW comb 3 results from multiple solitons and features a modulation of the spectral envelope. The soliton comb 2 is heavily impacted by a modal crossing on the short wavelength side, which decreases its bandwidth.

Heterodyning the combs creates a set of three RF combs centered for example at $f_m$, $f_m'$ and $|f_m'-f_m|$=828 MHz and with a line spacing of 373 kHz, 761 kHz, and 1.13 MHz respectively. Some weak low-frequency spurious products were observed in the RF combs 1+3 and 2+3, suggesting that the multi-soliton state of comb 3 has a lower stability. A soliton switching method (see for example reference 27, the entire contents of which is fully incorporated herein by reference) could provide a way to get all combs in the fundamental single soliton state, which appears to have better intrinsic stability. Additional technical noises, such as polarization fluctuation, could be avoided by using polarization maintaining elements or by improving the circulators isolation.

The triple soliton comb configuration with two co-propagating combs could find applications in advanced spectroscopy schemes such as two-dimensional spectroscopy, where pump and probe pulse trains are mixed in a sample and the mixing result is heterodyned with a third local oscillator comb, as illustrated in FIG. 4E. Optical distance measurements can also benefit from this triple comb scheme, as sending the comb pair onto the target could greatly improve the ambiguity range, via the Vernier effect.

The method and device of the present disclosure is configured to implement spatial multiplexing of soliton combs in a single microresonator 3 for the first time, both in co- and counter-propagating pump configuration.

The multiple soliton pulse streams have excellent mutual coherence, and their frequency offset is a substantial fraction of the repetition rate, preventing optical-to-RF mapping ambiguities. The generated dual-combs are shown to be suitable for spectroscopy. Large relative differences in repetition rates can be obtained, enabling fast acquisition and improved bandwidth usage. Even larger differences could be achieved by using the birefringence of and pumping modes with orthogonal polarizations (>100 MHz were observed), in combination with faster repetition rates. Such configurations could find application in RF signal processing and acquisition, or for ultra-rapid vibrational spectroscopy in condensed matter. The fast recording of a dual DKS-comb heterodyne can also prove useful to investigate soliton dynamics with unprecedented resolution, such as measuring the line-by-line spectral dynamics of a breathing soliton.

The results further highlight the importance of microresonator mode engineering for comb generation, which is already within reach of microfabricated ring resonators. New designs will allow the control of the mode frequency separation and repetition rate difference, while mitigating the impact of modal crossing. Furthermore, the waveguide geometric dispersion control, will enable larger bandwidth coverage, and central wavelength selectivity. The simplicity of the co-propagating scheme makes it compatible with full on-chip integration, as all the elements are readily available blocks of photonic integrated circuits.

The method of the present disclosure is flexible and easily scalable, as shown by the generation of three simultaneous soliton combs—so far out of reach for other frequency comb platforms. This multiple comb source has the potential to extend frequency comb-based spectroscopy to higher dimensionality, with the potential to increase information content, accuracy or speed of acquisition.

Exemplary Resonator Fabrication and Characteristics

The exemplary microresonator protrusion used in the measured results presented above was fabricated via ultra-precise diamond turning of a monocrystalline blank (for, example $MgF_2$) followed by hand polishing with diamond slurries and cleaning. The FSR of 12.4 GHz corresponds to a main radius of 2.8 mm. The resulting WGM protrusion can be approximated by an oblate spheroid with 80 μm minor radius. The obtained quality factors of the soliton-supporting resonances are above $10^9$ at 1554 nm.

Soliton Resonances Identification

The piezoelectric actuator of the external cavity diode pump laser is scanned over a full free spectral range FSR of the cavity at the exemplary wavelength of 1554 nm, while recording the transmission and the nonlinearly generated light on an analogue to digital converter. Five resonances featuring the typical step transition associated with the formation of solitons (see for example reference 12 or US2018/0205463 the contents of both of which are fully incorporated herein by reference) could be identified (FIG. 5A). Their relative offset was estimated using piezo voltage calibration.

Tuning Method

In order to initiate the dual-comb formation, a pair of mode families is first targeted. The pump laser is tuned close to one resonance and the modulation frequency of the sideband is set close to the resonance offset, while the bias of the SSB modulator is adjusted to generate a blue or red sideband, depending on the sign of the frequency shift needed. After a coarse adjustment, both resonances are visible when scanning the pump laser over a small frequency span (FIG. 5B). The final adjustment consists of tuning the sideband frequency shift so that the large detuning end of each the soliton step becomes aligned (FIG. 5C). When scanning the laser, two solitons can then be excited simultaneously.

Larger Repetition Rate Difference Via Mode Families selection

Several RF comb offset frequencies and repetition rate differences can be achieved in the same resonator, by changing the pair of modes supporting the solitons. In this way the Inventors generate solitons in the co-propagating direction (FIG. 6A) with an offset of 4.9 GHz and a repetition rate difference of ~9 MHz. The resulting RF comb (FIG. 6B) spans more than 4 GHz. However, this high offset frequency $f_m$ combined with a broader comb implies that the RF comb extends beyond $f_{rep}/2$ and thus overlaps with the mirror comb centred at $f_{rep}-f_m^3$, leading to potential mapping ambiguities in the overlap region. Engineering the modes of the microresonator, enabled by better fabrication control, will allow an optimal bandwidth usage.

In the measurements, the detuning of the laser with respect to one of the pumped modes can be actively stabilized via an offset Pound-Drever-Hall (PDH) lock (see for example reference 35 the entire contents of which is incorporated herein by reference). This better ensures that any resonance-laser detuning that may occur remains within the soliton supporting range, as the resonator is free-running and can be subject to temperature drift. With regards to the relative stability of the produced dual-comb, this means that the main source of instability can be the drift of the repetition rates difference $d\ f_{rep}$, since the frequency offset between the two pumps is set via electro-optic modulation. The inventors counted the repetition rates of two counter-propagating combs and performed an Allan deviation analysis (FIG. 7). Up to 10 ms, the repetition rates are averaging down, meaning that coherent averaging can be performed up to this duration. On longer timescales, thermal drifts dominate, but it is believed that if required the stability can be easily improved via a thermal stabilization scheme based on the measurement of $\Delta f_{rep}$.

While the invention has been disclosed with reference to certain preferred embodiments, numerous modifications, alterations, and changes to the described embodiments, and equivalents thereof, are possible without departing from the sphere and scope of the invention. Accordingly, it is intended that the invention not be limited to the described embodiments, and be given the broadest reasonable interpretation in accordance with the language of the appended claims.

REFERENCES

1. Hansch, T. W. Nobel Lecture: Passion for precision. *Rev. Mod. Phys.* 78, 1297-1309 (2006).
2. Keilmann, F., Gohle, C. & Holzwarth, R. Time-domain mid-infrared frequency-comb spectrometer. *Opt. Lett.* 29, 1542-1544 (2004).
3. Coddington, I., Newbury, N. & Swann, W. Dual-comb spectroscopy. *Optica* 3, 414 (2016).
4. Schliesser, A., Brehm, M., Keilmann, F. & Weide, D. W. D. van der. Frequency-comb infrared spectrometer for rapid, remote chemical sensing. *Optics Express* 13, 9029-9038 (2005).
5. Ideguchi, T., Poisson, A., Guelachvili, G., Picqué, N. & Hänsch, T. W. Adaptive real-time dual-comb spectroscopy. *Nature communications* 5, 3375 (2014).
6. Hugi, A., Villares, G., Blaser, S., Liu, H. C. & Faist, J. Mid-infrared frequency comb based on a quantum cascade laser. *Nature* 492, 229-233 (2012).
7. Villares, G., Hugi, A., Blaser, S. & Faist, J. Dual-comb spectroscopy based on quantum-cascade-laser frequency combs. *Nature Communications* 5, 1-3 (2014).
8. Coddington, I., Swann, W. C., Nenadovic, L. & Newbury, N. R. Rapid and precise absolute distance measurements. *Nature Photonics* 3, 351-356 (2009).
9. Ideguchi, T. et al. Coherent Raman spectro-imaging with laser frequency combs. *Nature* 502, 355-8 (2013).
10. Del'Haye, P. et al. Optical frequency comb generation from a monolithic microresonator. *Nature* 450, 1214-7 (2007).

11. Bozinovic, N. et al. Terabit-Scale Orbital Angular Momentum Mode Division Multiplexing in Fibers. *Science* 340, 1545-1548 (2013).
12. Herr, T. et al. Temporal solitons in optical microresonators. *Nature Photonics* 8, 145-152 (2013).
13. Lomsadze, B. & Cundiff, S. T. Frequency combs enable rapid and high-resolution multidimensional coherent spectroscopy. *Science* 357, 1389-1391 (2017).
14. Richardson, D. J., Fini, J. M. & Nelson, L. E. Space-division multiplexing in optical fibres. *Nature Photonics* 7, 354-362 (2013).
15. Guo, X., Zou, C.-L. & Tang, H. X. Second-harmonic generation in aluminum nitride microrings with 2500%/W conversion efficiency. *Optica* 3, 1126 (2016).
16. Leo, F. et al. Temporal cavity solitons in one-dimensional Kerr media as bits in an all-optical buffer. *Nature Photonics* 4, 471-476 (2010).
17. Lugiato, L. A. & Lefever, R. Spatial Dissipative Structures in Passive Optical Systems. *Physical review letters* 58, 2209-2211 (1987).
18. Jost, J. D. et al. Counting the cycles of light using a self-referenced optical microresonator. *Optica* 2, 706-711 (2015).
19. Brasch, V., Lucas, E., Jost, J. D., Geiselmann, M. & Kippenberg, T. J. Self-referenced photonic chip soliton Kerr frequency comb. *Light Sci Appl.* 6, e16202 (2017).
20. Suh, M. G., Yang, Q. F., Yang, K. Y., Yi, X. & Vahala, K. J. Microresonator soliton dual-comb spectroscopy. *Science* 354, 600-603 (2016).
21. Marin-Palomo, P. et al. Microresonator-based solitons for massively parallel coherent optical communications. *Nature* 546, 274-279 (2017).
22. Trocha, P. et al. Ultrafast optical ranging using microresonator soliton frequency combs. (2017).
23. Suh, M.-G. & Vahala, K. Soliton Microcomb Range Measurement.
24. Suh, M.-G. et al. Searching for Exoplanets Using a Microresonator Astrocomb. (2018).
25. Obrzud, E. et al. A Microphotonic Astrocomb. (2017).
26. Spencer, D. T. et al. An Integrated-Photonics Optical-Frequency Synthesizer. (2017).
27. Guo, H. et al. Universal dynamics and deterministic switching of dissipative Kerr solitons in optical microresonators. *Nature Physics* 13, 94-102 (2017).
28. Skryabin, D. V. Soliton Self-Frequency Shift Cancellation in Photonic Crystal Fibers. *Science* 301, 1705 (2003).
29. Karpov, M. et al. Raman Self-Frequency Shift of Dissipative Kerr Solitons in an Optical Microresonator. *Physical Review Letters* 116, 103902 (2016).
30. Brasch, V. et al. Photonic chip-based optical frequency comb using soliton Cherenkov radiation. *Science* 351, 357-360 (2015).
31. Lucas, E., Karpov, M., Guo, H., Gorodetsky, M. L. & Kippenberg, T. J. Breathing dissipative solitons in optical microresonators. *Nature Communications* 8, 736 (2017).
32. Cole, D. C., Lamb, E. S., Del'Haye, P., Diddams, S. A. & Papp, S. B. Soliton crystals in Kerr resonators. *Nature Photonics* 11, 671-676 (2017).
33. Herr, T. et al. Mode spectrum and temporal soliton formation in optical microresonators. *Physical Review Letters* 113, 123901 (2014).
34. Lucas, E., Guo, H., Jost, J. D., Karpov, M. & Kippenberg, T. J. Detuning-dependent properties and dispersion-induced instabilities of temporal dissipative Kerr solitons in optical microresonators. *Physical Review A* 95, 43822 (2017).
35. Lucas, E., Jost, J. D., Beha, K., Holzwarth, R. & Kippenberg, T. Soliton-Based Optical Kerr Frequency Comb for Low-Noise Microwave Generation. in *2017 ieee international frequency control symposium* 530-533 (IEEE, 2017).
36. Matsko, A. B., Liang, W., Savchenkov, A. A., Eliyahu, D. & Maleki, L. Optical Cherenkov radiation in overmoded microresonators. *Optics Letters* 41, 2907 (2016).
37. Yang, Q.-F., Yi, X., Yang, K. Y. & Vahala, K. Spatial-mode-interaction-induced dispersive waves and their active tuning in microresonators. *Optica* 3, 1132 (2016).
38. Guo, H. et al. Intermode Breather Solitons in Optical Microresonators. *Physical Review X* 7, 041055 (2017).
39. Yang, Q. F., Yi, X., Yang, K. Y. & Vahala, K. Stokes solitons in optical microcavities. *Nature Physics* 13, 53-57 (2017).
40. Bao, C. et al. Orthogonally Polarized Kerr Frequency Combs. (2017).
41. Donvalkar, P. et al. Broadband Frequency Comb Generation in the Near-Visible using Higher-Order Modes in Silicon Nitride Microresonators. in *Conference on lasers and electro-optics* STu4J.5 (OSA, 2017).
42. Zhao, X. et al. Dual Comb Generation in a Single Microresonator. in *Conference on lasers and electro-optics* STh3L.4 (OSA, 2017).
43. Cundiff, S. T. & Mukamel, S. Optical multidimensional coherent spectroscopy. *Physics Today* 66, 44-49 (2013).
44. Link, S. M., Maas, D. J. H. C., Waldburger, D. & Keller, U. Dual-comb spectroscopy of water vapor with a free-running semiconductor disk laser. *Science* 356, 1164-1168 (2017).
45. Millot, G. et al. Frequency-agile dual-comb spectroscopy. *Nature Photonics* 10, 27-30 (2015).
46. Dutt, A. et al. Dual-comb Spectroscopy using On-chip Mode-locked Frequency Combs. in *Conference on lasers and electro-optics* STh3L.2 (Optical Society of America, 2017).
47. Joshi, C. et al. Counter-rotating cavity solitons in a silicon nitride microresonator. *Optics Letters* 43, 547 (2018).
48. Yang, Q. F., Yi, X., Yang, K. Y. & Vahala, K. Counter-propagating solitons in microresonators. *Nature Photonics* 11, 560-564 (2017).
49. Grudinin, I. S. & Yu, N. Dispersion engineering of crystalline resonators via microstructuring. *Optica* 2, 221 (2015).
50. Izutsu, M., Shikama, S. & Sueta, T. Integrated optical SSB modulator/frequency shifter. *IEEE Journal of Quantum Electronics* 17, 2225-2227 (1981).
51. Esman, D., Ataie, V., Kuo, B. P.-P., Alic, N. & Radic, S. Subnoise Signal Detection and Communication. *Journal of Lightwave Technology* 34, 5214-5219 (2016).
52. Bao, C. et al. Observation of Fermi-Pasta-Ulam Recurrence Induced by Breather Solitons in an Optical Microresonator. *Physical Review Letters* 117, 163901 (2016).
53. Kim, S. et al. Dispersion engineering and frequency comb generation in thin silicon nitride concentric microresonators. *Nature Communications* 8, (2017).
54. Pfeiffer, M. H. P. et al. Octave-spanning dissipative Kerr soliton frequency combs in Si3N4 microresonators. *Optica* 4, 684-691 (2017).
55. Lee, S. H. et al. Towards visible soliton microcomb generation. *Nature Communications* 8, 1-8 (2017).
56. Karpov, M., Pfeiffer, M. H. P. & Kippenberg, T. J. Photonic chip-based soliton frequency combs covering the biological imaging window. (2017).

The entire contents of each of the above reference is incorporated herein by reference.

The invention claimed is:

1. A multiple soliton comb generation method comprising the steps of:
providing a single optical resonator configured to support a plurality of distinct spatial modes in which light can propagate;
providing an optical pump source;
simultaneously optically pumping a plurality of distinct spatial modes of the single optical resonator to simultaneously generate independent soliton states in the distinct spatial modes and generate a plurality of frequency combs,
wherein the optical pumping is carried out using light from a continuous wave laser emission and at least one optical sideband generated via modulation of the laser light, the laser light and the at least one modulated optical sideband having different optical frequencies, and
wherein the laser light and the at least one modulated optical sideband counter-propagate in opposite directions in the single optical resonator.

2. The method according to claim 1, including the steps of optically pumping a first distinct spatial mode of the single optical resonator to generate solitons in a first independent soliton state in the first distinct spatial mode and generate a first frequency comb; and optically pumping a second distinct spatial mode of the optical resonator to simultaneously generate solitons in a second independent soliton state in the second distinct spatial mode and generate a second frequency comb.

3. The method according to claim 1, wherein the optical frequencies match soliton-supporting resonances of the single optical resonator.

4. The method according to claim 1, wherein scanning of the laser emission wavelength is carried out to trigger soliton formation simultaneously in the first and the second spatial modes.

5. The method according to claim 4, wherein the laser is tuned across the resonances using current or piezo-actuator tuning, or a modulation frequency that generates the at least one modulated optical sideband is adjusted to trigger simultaneous soliton formation in the first and the second spatial modes.

6. The method according to claim 1, wherein the modulated optical sideband is generated using an electro-optical modulator, or a sideband modulator or an IQ-modulator.

7. The method according to claim 1, wherein the laser light is coupled to the single optical resonator to propagate in a first direction in the single optical resonator, and the at least one modulated optical sideband is coupled to the single optical resonator to propagate in a second direction in the single optical resonator, the first and second directions being opposite directions.

8. The method according to claim 1, wherein the laser light, the first modulated optical sideband, and a second modulated optical sideband optically pump first, second and third distinct spatial modes of the single optical resonator to simultaneously generate first, second and third independent soliton states and generate first, second and third frequency combs.

9. The method according to claim 8, wherein the laser light is coupled to the single optical resonator to propagate in a first direction in the single optical resonator, and the first and second modulated optical sidebands are coupled to the single optical resonator to propagate in a second direction in the single optical resonator, the first and second directions being opposite directions.

10. A multiple soliton comb generator comprising:
a single optical resonator configured to support a plurality of independent or distinct spatial modes in which light can propagate;
an optical pump source configured to simultaneously optically pump a plurality of distinct spatial modes of the single optical resonator to generate independent soliton states in the plurality of distinct spatial modes of the single optical resonator and to generate a plurality of frequency combs,
wherein the optical pump source includes a laser and a modulation sideband generator, the modulation sideband generator configured to generate at least one modulation optical sideband using the laser light, the laser light and the at least one modulation optical sideband having different optical frequencies, and
wherein the generator includes at least one coupler, and first and second circulators; and the single optical resonator, the optical pump source, the at least one coupler and the first and second circulators are arranged so that the laser light and the at least one modulation optical sideband counter-propagate in opposite directions in the single optical resonator.

11. The generator according to claim 10, wherein the different optical frequencies match soliton-supporting resonances of the single optical resonator.

12. The generator according to claim 10, further including a controller configured to scan a laser emission wavelength of the laser to trigger soliton formation simultaneously in the plurality of spatial modes.

13. The generator according to claim 12, wherein the controller is configured to tune the laser across the resonances using laser current tuning or piezo-actuator tuning, or is configured to adjust a modulation frequency of the modulation sideband generator to change the optical frequency of the at least one modulation optical sideband to trigger simultaneous soliton formation in the spatial modes.

14. The generator according to claim 10, wherein the modulation sideband generator includes an electro-optical modulator, or a sideband modulator or an IQ-modulator or a differential quadrature phase shift keying modulator.

15. The generator according to claim 10, wherein the pumped plurality of different spatial modes of the single optical resonator are spatial modes of the same polarization.

16. The generator according to claim 10, wherein the first and second circulators are further configured to collect the generated frequency combs from the single optical resonator.

17. The generator according to claim 10 wherein the modulation sideband generator is configured to generate a first and second modulation optical sideband using the laser light, and the single optical resonator, the optical pump source, the at least one coupler and the first and second circulators are arranged so that the laser light, the first modulation optical sideband, and the second modulation optical sideband optically pump first, second and third discrete spatial modes of the single optical resonator to simultaneously generate first, second and third independent soliton states and generate first, second and third frequency combs.

18. The generator according to claim 17, wherein the single optical resonator, the optical pump source, the at least one coupler and the first and second circulators are arranged so that the laser light is coupled to the single optical resonator to propagate in a first direction in the optical resonator, and the first and second modulation optical sidebands are coupled to the single optical resonator to propagate in a second direction in the optical resonator, the first and second directions being opposite directions.

19. The generator according to claim 18, wherein two frequency combs are generated in the second propagating direction, and one frequency comb is generated in the first propagating direction.

* * * * *